(12) United States Patent
De Boer et al.

(10) Patent No.: US 12,077,652 B2
(45) Date of Patent: *Sep. 3, 2024

(54) OXIDATIVELY CURABLE COATING COMPOSITION

(71) Applicant: Milliken Industrials Limited, Wigan (GB)

(72) Inventors: Johannes Wietse De Boer, Leiden (NL); Ronald Hage, Leiden (NL); Karin Maaijen, Leiden (NL); Yfranka Petronella Areke Roelofsen, Leiden (NL); Peter Comba, Heidelberg (DE)

(73) Assignee: Milliken Industrials Limited, Wigan (GB)

( * ) Notice: Subject to any disclaimer, the term of this patent is extended or adjusted under 35 U.S.C. 154(b) by 838 days.

This patent is subject to a terminal disclaimer.

(21) Appl. No.: 17/257,502

(22) PCT Filed: Jul. 4, 2019

(86) PCT No.: PCT/GB2019/051901
§ 371 (c)(1),
(2) Date: Dec. 31, 2020

(87) PCT Pub. No.: WO2020/008205
PCT Pub. Date: Jan. 9, 2020

(65) Prior Publication Data
US 2022/0073701 A1    Mar. 10, 2022

(30) Foreign Application Priority Data
Jul. 5, 2018    (EP) ..................................... 18181908

(51) Int. Cl.
*C08K 5/3432*    (2006.01)
*C09D 167/08*    (2006.01)

(52) U.S. Cl.
CPC .......... *C08K 5/3432* (2013.01); *C09D 167/08* (2013.01)

(58) Field of Classification Search
CPC ............................ C07D 471/08; C09D 167/08
See application file for complete search history.

(56) References Cited

U.S. PATENT DOCUMENTS

2016/0096918 A1* 4/2016 Nava .................... C08G 63/183
                                                          525/437
2018/0327568 A1* 11/2018 Flapper ................ C01G 31/006

FOREIGN PATENT DOCUMENTS

| BR | 112015014441 | 7/2017 | |
|---|---|---|---|
| CN | 103602268 | 2/2014 | |
| CN | 104995264 | 10/2015 | |
| CN | 107709533 | 2/2018 | |
| EP | 3272823 A1 | 1/2018 | |
| WO | 2003/104378 A1 | 12/2003 | |
| WO | WO-2005042532 A1 * | 5/2005 | ........... C07D 471/08 |
| WO | 2015/082553 A1 | 6/2015 | |
| WO | 2018015333 | 1/2018 | |

OTHER PUBLICATIONS

H. Borzel et. al., Iron coordination chemistry with tetra-, penta- and hexadendate bispidine-type ligands, Inorganica Chimica Acta 337 (2002) 407-419.*
International Search Report issued in PCT/GB2019/051901 on Oct. 21, 2019 (5 pages).
Written Opinion issued in PCT/GB2019/051901 on Oct. 21, 2019 (8 pages).
International Preliminary Report on Patentability and Written Opinion for PCT/GB2019/051901 dated Jan. 14, 2021.

* cited by examiner

*Primary Examiner* — Brieann R Johnston

(57) ABSTRACT

The present invention relates to an oxidatively curable coating formulation comprising an oxidatively curable alkyd-based resin and a bispidon-based chelant, which chelant may optionally be complexed with a suitable transition metal ion. The formulations may be paints or other oxidatively curable coating compositions. The invention also provides methods for making such formulations and compositions resultant from the curing of such formulations.

13 Claims, No Drawings

OXIDATIVELY CURABLE COATING COMPOSITION

CROSS-REFERENCE TO RELATED APPLICATIONS

This application is a national stage patent application of International Application No. PCT/GB2019/051901 filed 4 Jul. 2019 claiming priority to EP 18181908.7 filed 5 Jul. 2018, both applications fully incorporated by reference in their entirety.

FIELD OF THE INVENTION

The present invention relates to an oxidatively curable coating formulation comprising an oxidatively curable alkyd-based resin and a bispidon-based chelant, which chelant may optionally be complexed with a suitable transition metal ion. The formulations may be paints or other oxidatively curable coating compositions. The invention also provides methods for making such formulations and compositions resultant from the curing of such formulations.

BACKGROUND OF THE INVENTION

Alkyd resins are a well understood and dominant binder in many oxidatively curable paints and other solvent-based coatings. Alkyd emulsion paints, in which the continuous phase is aqueous, are also widely available commercially. Alkyd resins are produced by the reaction of polyols with carboxylic acids or anhydrides. To make them susceptible to what is commonly referred to as a drying process, some alkyd resins are reacted with unsaturated triglycerides or other source of unsaturation. Plant and vegetable oils, such as linseed oil, are frequently used as the source of triglycerides. In these drying processes, unsaturated groups, in particular carbon-carbon double bonds, can react with oxygen from the air, causing the oils to crosslink, forming a three-dimensional network, and harden. This oxidative curing process, although not drying, gives the appearance of drying and is often and herein referred to as such. The length of time required for drying depends on a variety of factors, including the constituents of the alkyd resin formulation and the amount and nature of the liquid continuous phase (e.g. solvent) in which the alkyd resin is formulated.

Film formation results from the autoxidation and polymerisation chemistries that occur during the drying of alkyd-based resins. It will proceed in the absence of catalysis. However, it is customary to include in formulations of curable resins small, i.e. catalytic, quantities of optionally organic metal salts, often referred to as metal driers, which catalyse the polymerisation of unsaturated material so as to form the three-dimensional network.

Driers used for solvent-based coatings typically include alkyl carboxylates, typically $C_6$-$C_{18}$ carboxylates, of metals such as cobalt, manganese, lead, zirconium, zinc, vanadium, strontium, calcium and iron. Such metal carboxylates are often referred to as metal soaps. Redox-active metals, such as iron, manganese, cobalt, vanadium and copper enhance radical formation, and thus the oxidative curing process, whilst so-called secondary driers (sometimes referred to as auxiliary driers), such as complexes based on strontium, zirconium and calcium, enhance the action of the redox-active metals. Often these soaps are based on medium-chain alkyl carboxylates such as 2-ethyl-hexanoate. The lipophilic units in such soaps enhance the solubility of the drier in solvent-based paints and other oxidatively curable coating compositions.

As well as metal soaps, a variety of metal driers that are redox metal complexes containing organic ligands can be used as driers, for example manganese complexes comprising 2,2'-bipyridine or 1,10-phenanthroline ligands.

Whilst cobalt driers have been employed for many years as paint driers, there is a desire to develop alternatives, not least since cobalt soaps may need to be registered as carcinogenic materials. Iron- and manganese-based paint driers in particular have received considerable attention in recent years in the academic and patent literature as alternatives to cobalt-based driers. For some recent scientific publications addressing this topic in detail see publications by J H Bieleman (in *Additives in Plastics and Paints, Chimia*, 56, 184-190 (2002)); J H Bieleman (*Macromol. Symp.*, 187, 811-822 (2002)); and R E van Gorkum and E Bouwman (*Coord. Chem. Rev.*, 249, 1709-1728 (2005)).

WO 03/093384 A1 (Ato B. V.) describes the use of reducing biomolecules in combination with transition-metal salts or complexes based on pyrazoles, aliphatic and aromatic amines, 2,2'-bipyridine, 1,10'-phenanthroline and 1,4,7-trimethyl-1,4,7-triazacyclononane ($Me_3TACN$).

WO 03/029371 A1 (Akzo Nobel N.V.) describes the use of complexes comprising Schiff base compounds to enhance the drying of coatings, in which complexes at least one solubilising group is covalently bound to the organic ligand.

EP 1382648 A1 (Universiteit Leiden) describes the use of manganese complexes with acetylacetonate and bidentate nitrogen donor ligands in paint drying.

Oyman et al. describe the oxidative drying of alkyd paints by $[Mn_2(\mu-O)_3(Me_3TACN)_2](PF_6)_2$ (Z O Oyman et al., *Surface Coating International Part B—Coatings Transaction*, 88, 269 (2005)). WO 2011/098583 A1, WO 2011/098584 A1 and WO 2011/098587 A1 (each DSM IP Assets B.V.) describe the use of a variety of dinuclear manganese complexes with $Me_3TACN$ as ligand for paint drying.

WO 2012/092034 A2 (Dura Chemicals, Inc.) describes the use of a transition metal and a porphyrin based ligand as a siccative for resin compositions.

The use of mixtures of metal salts and ligands to enhance drying of paint formulations is known. For example, W H Canty, G K Wheeler and R R Myers (*Ind. Eng. Chem.*, 52, 67 (1960)) describe the drying capability of a mixture of 1,10-phenanthroline (phen) and Mn soap, which is similar to that of prepared Mn-phen complexes. Mixtures of 2,2'-bipyridine (bpy) and manganese soaps show a better drying performance than manganese soaps without bpy (see P K Weissenborn and A Motiejauskaite, *Prog. Org. Coat.*, 40, 253 (2000)). Also, R van Gorkum et al. (*Inorg. Chem.*, 43, 2456 (2004)), describe that the addition of bpy to Mn(acetylacetonate)$_3$ gives an acceleration in the drying performance, and attribute this to the formation of manganese-bipyridine complexes. The use of manganese complexes with acetylacetonate and bidentate nitrogen donor ligands in paint drying has also been described in EP 1382648 A1 (Universiteit Leiden).

WO 2008/003652 A1 (Unilever PLC et al.) describes the use of tetradentate, pentadentate or hexadentate nitrogen ligands bound to manganese and iron as siccative for curing alkyd-based resins. Amongst the ligands mentioned are bispidon ligands: [3.3.1] bicyclic nitrogen donor ligands based on 9-oxo-3,7-diazabicyclo[3.3.1]nonane and related structures in which the 9-oxo moiety may be replaced with —$[C(Rx)_2]_{0-3}$-, wherein each Rx is independently hydrogen, hydroxyl, $C_{1-4}$alkoxy or $C_{1-4}$alkyl. A characteristic feature of the bispidons described in this publication is the presence of two 2-pyridyl groups attached to carbon atoms flanking one of the two symmetrical nitrogen atoms (either that at position 3 or 7). Examples of such bispidons referenced in this publication are those described in WO 00/60045 A1 (The Procter & Gamble Company) and WO 02/48301 A1 & WO 03/104379 A1 (both Unilever plc et al.).

Additional bis(2-pyridyl) bispidons are described in WO 2005/042532 A1 (Unilever plc et al.). WO 2017/085154 A1 (Akzo Nobel Coatings International BV) describe coating composition comprising a drier composition, which includes an iron complex comprising a bis(2-pyridyl) bispidon and a vanadium compound.

Bis(2-pyridyl) bispidons are also described in WO 2012/079624 A1 (PPG Europe BV), WO 2013/045475 A1 (PPG Europe BV), US 2014/0262917 A1 (Valspar Sourcing, Inc.), WO 2014/070661 A1 (Ashland Licensing and Intellectual Property LLC) and WO 2015/082553 A1 (PPG Europe B.V.).

In WO 2013/083630 A1 (DSM Assets B.V.) is described the use of iron-bispidon complexes to accelerate the peroxide-initiated radical copolymerisation of a resin composition comprising unsaturated polyester resin and vinyl ester. Although direct bis(2-pyridyl) substitution of the bicyclic scaffold is not mandatory, bis(2-pyridyl) substitution is preferred and bispidons exemplified have this substitution pattern.

WO 2016/198890 A1 and WO 2016/198891 A1 (both Chemsenti Limited) describe methods of generating chlorine dioxide from chlorite salts in the presence of manganese and iron ion-containing complexes, which complexes may comprise bispidon ligands.

Additional bispidons are described in WO 2009/010129 A1 (Universität Heidelberg), as are metal complexes comprising these and the use of such metal complexes in organic synthesis (for example olefin oxidation), in bleaching, and in the radiopharmaceutical field. There is no disclosure in this publication of the use of bispidon-containing complexes in the curing of oxidatively curable coating formulations. Although direct bis(2-pyridyl) substitution of the bicyclic scaffold is not mandatory, these bispidons have particular substituents on one of the N-3 or N-7 nitrogen atoms. Moreover, the exemplified bispidons either comprise no substituents at any of the four carbon atoms adjacent to the N-3 or N-7 nitrogen atoms, or bis(2-pyridyl) substitution.

In view of the ongoing wish to develop alternatives to cobalt-based driers, there remains a need in the art of oxidatively curable formulations for the provision of further curable formulations, which nevertheless exhibit acceptable rates of curing. The present invention is intended to address this need.

SUMMARY OF THE INVENTION

We have surprisingly found that transition metal complexes comprising bispidon ligands comprising heteroaryl groups other than 2-pyridyl, which are directly attached to the bicyclic moiety within bispidons, catalyse faster curing of oxidatively curable coating formulations than would have been expected given their close structural similarity with analogous complexes comprising bis(2-pyridyl) bispidons. Additionally, the invention is based upon the recognition of the ability of bridged bispidons to catalyse curing of oxidatively curable coating formulations.

Viewed from a first aspect, therefore, the invention provides a formulation comprising an oxidatively curable alkyd-based resin and a chelant of formula (I) or formula (II):

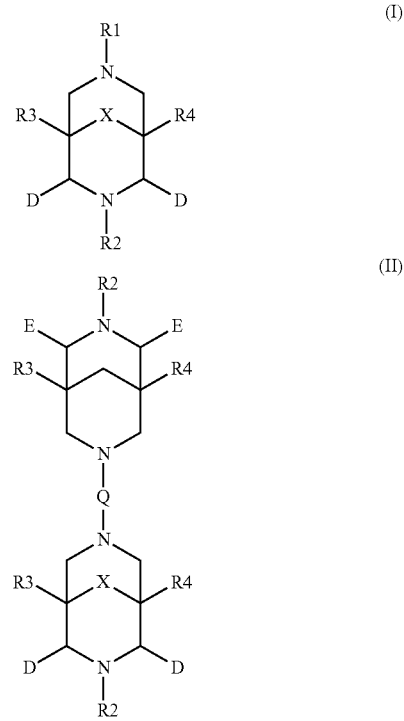

wherein:
each D is independently selected from the group consisting of thiazol-2-yl, thiazol-4-yl, pyrazin-2-yl, quinolin-2-yl, pyrazol-3-yl, pyrazol-1-yl, pyrrol-2-yl, imidazol-2-yl, imidazol-4-yl, benzimidazol-2-yl, pyrimidin-2-yl, 1,2,4-triazol-3-yl, 1,2,4-triazol-1-yl, 1,2,3-triazol-1-yl, 1,2,3-triazol-2-yl and 1,2,3-triazol-4-yl, each of which may be optionally substituted by one or more groups independently selected from the group consisting of —F, —Cl, —Br, —OH, —OC$_1$-C$_4$alkyl, —NH—CO—H, —NH—CO—C$_1$-C$_4$alkyl, —NH$_2$, —NH—C$_1$-C$_4$alkyl, and —C$_1$-C$_4$alkyl;

each E is independently selected from the group consisting of pyridin-2-yl, thiazol-2-yl, thiazol-4-yl, pyrazin-2-yl, quinolin-2-yl, pyrazol-3-yl, pyrazol-1-yl, pyrrol-2-yl, imidazol-2-yl, imidazol-4-yl, benzimidazol-2-yl, pyrimidin-2-yl, 1,2,4-triazol-3-yl, 1,2,4-triazol-1-yl, 1,2,3-triazol-1-yl, 1,2,3-triazol-2-yl and 1,2,3-triazol-4-yl, each of which may be optionally substituted by one or more groups independently selected from the group consisting of —F, —Cl, —Br, —OH, —OC$_1$-C$_4$alkyl, —NH—CO—H, —NH—CO—C$_1$-C$_4$alkyl, —NH$_2$, —NH—C$_1$-C$_4$alkyl, and —C$_1$-C$_4$alkyl;

R1 and the or each R2 are independently selected from the group consisting of C$_1$-C$_{24}$alkyl, C$_{6-10}$arylC$_1$-C$_6$alkyl, C$_{6-10}$aryl, C$_5$-C$_{10}$ heteroarylC$_1$-C$_6$alkyl, each of which may be optionally substituted by one or more groups selected from —F, —Cl, —Br, —OH, —OC$_1$-C$_4$alkyl, —NH—CO—H, —NH—CO—C$_1$-C$_4$alkyl, —NH$_2$, —NH—C$_1$-C$_4$alkyl and —SC$_1$-C$_4$alkyl; and CH$_2$CH$_2$N(R8)(R9), wherein N(R8)(R9) is selected from the group consisting of di($C_{1-44}$alkyl)amino; di($C_{6-10}$aryl)amino in which each of the aryl groups is independently optionally substituted with one or more $C_{1-20}$alkyl groups; di($C_{6-10}$aryl$C_{1-6}$alkyl)amino in which each of the aryl groups is independently optionally substituted with one or more $C_{1-20}$alkyl groups; NR7, in which R7 and the nitrogen atom N to which it is attached represent a heterocycloalkyl group optionally substituted with one or more $C_{1-20}$alkyl groups, which is connected to the remainder of R1 or R2 through the nitrogen atom N; di(heterocycloalkyl$C_{1-6}$alkyl)amino, in which each of the heterocycloalkyl groups is independently optionally substituted with one or more $C_{1-20}$alkyl groups; and di(heteroaryl$C_{1-6}$alkyl)amino, wherein each of the heteroaryl groups is independently optionally substituted with one or more $C_{1-20}$alkyl groups;

R3 and R4 are independently selected from hydrogen, $C_1$-$C_8$alkyl, $C_1$-$C_8$alkyl-O—$C_1$-$C_8$alkyl, $C_6$-$C_{10}$aryloxy$C_1$-$C_8$alkyl, $C_6$-$C_{10}$aryl, $C_1$-$C_8$hydroxyalkyl, $C_6$-$C_{10}$aryl$C_1$-$C_6$alkyl and $C_5$-$C_{10}$heteroaryl$C_1$-$C_6$alkyl, and —$(CH_2)_{0-4}$C(O)OR5 wherein R5 is independently selected from: hydrogen, $C_1$-$C_8$alkyl and $C_{6-10}$aryl;

Q represents a bridge selected from the group consisting of a $C_{1-6}$alkylene moiety, a $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups; and X is selected from C=O, —[C(R6)$_2$]$_{0-3}$- wherein each R6 is independently selected from hydrogen, hydroxyl, $C_1$-$C_4$alkoxy and $C_1$-$C_4$alkyl.

The chelant in the formulation may or may not be part of a complex comprising a suitable transition metal ion.

Viewed from a second aspect, the invention provides a method of preparing a formulation according to the first aspect of the invention, the method comprising contacting a composition comprising an alkyd-based resin with a formulation comprising a chelant of formula (I) or formula (II). The chelant in the composition comprising it may or may not be part of a complex comprising a suitable transition metal ion.

Viewed from a third aspect, the invention provides a composition resultant from curing of a formulation of the first aspect of the invention, or of a formulation obtainable according to the second aspect of the invention. Typically, such cured formulations will result from the curing the formulations comprising a complex comprising a chelant of formula (I) or formula (II) and a suitable transition metal ion.

Viewed from a fourth aspect, the invention provides a chelant of formula (I) or formula (II), which is dimethyl 2,4-di(thiazol-2-yl)-3-methyl-7-(pyridin-2-ylmethyl)-3,7-diaza-bicyclo[3.3.1]nonan-9-one-1,5-dicarboxylate, dimethyl 2,4-di(thiazol-2-yl)-3-(pyridin-2-ylmethyl)-7-methyl-3,7-diaza-bicyclo[3.3.1]nonan-9-one-1,5-dicarboxylate, dimethyl 2,4-di(thiazol-4-yl)-3-methyl-7-(pyridin-2-ylmethyl)-3,7-diaza-bicyclo[3.3.1]nonan-9-one-1,5-dicarboxylate, dimethyl 2,4-di(thiazol-4-yl)-3-(pyridin-2-ylmethyl)-7-methyl-3,7-diaza-bicyclo[3.3.1]nonan-9-one-1,5-dicarboxylate, 1,2-di{3-(pyridin-2-ylmethyl)-9-oxo-2,4-di(pyridin-2-yl)-(3,7-diazabicyclo[3.3.1]nonan-7-yl)-1,5-di(carboxylate methyl ester)}ethane or 1,3-di{3-(pyridin-2-ylmethyl)-9-oxo-2,4-di(pyridin-2-yl)-(3,7-diazabicyclo[3.3.1]nonan-7-yl)-1,5-di(carboxylate methyl ester)}propane, or a transition metal ion complex thereof.

Viewed from a fifth aspect, the invention provides a kit comprising a formulation according to the first aspect of the invention, or obtainable according to the second aspect of the invention, which formulation comprises less than 0.00005% by weight of ions of each of at least iron, manganese, cobalt, vanadium and copper and, separately, a composition comprising transition metal ions selected from the group consisting of iron, manganese, vanadium and copper ions.

Viewed from a sixth aspect, the invention provides a method comprising applying to a substrate a formulation according to the first aspect of the invention, or obtainable according to the second aspect of the invention.

Further aspects and embodiments of the present invention will be evident from the discussion that follows below.

DETAILED DESCRIPTION OF THE INVENTION

As summarised above, the present invention is based, in part, on the recognition that transition metal complexes, for example, of iron or manganese, comprising bispidon ligands, or chelants, of formula (I) or formula (II) catalyse faster curing of oxidatively curable alkyd-based resin formulations than would have been expected from the prior art.

The oxidatively curable resin of the formulation is alkyd-based. As noted above, alkyd resins are a well-understood binder class used in film-forming coating compositions. The term coating composition is to be interpreted broadly and embraces, for example, varnishes, primary coats, filling pastes and glazes. Coating compositions may be solvent-based or water based, e.g. emulsions. Typical coating compositions comprise solvent-based air-drying coatings and/or paints for domestic use. According to particular embodiments of the present invention, the formulations of the invention (including the fully formulated oxidatively curable coating compositions described herein) are paints. The formulations of the invention (including the fully formulated oxidatively curable coating compositions described herein) may comprise inks, for example a metal plate ink, lithographic ink, relief printing ink, screen ink or offset overprinting ink.

By oxidatively curable alkyd-based resin formulations is meant herein liquids that form a continuous solid coating as a consequence of the course of oxidative reactions (curing) and generally evaporation of a liquid continuous phase (generally solvent).

Typically, curing results in formation of cross-linkages and other bond formations through reactions involving unsaturated components within alkyd-based resin formulations.

In alkyd-based resin formulations, also referred to herein as alkyd-based formulations, the major binder present is an alkyd. By binder is meant in the art and herein the film-forming (curable) component within curable compositions, i.e. the component within the compositions that forms the desired three-dimensional network upon curing.

Typically, the curable component of an oxidatively curable composition (e.g. a formulation of the invention) will comprise between about 1 and about 98% by weight, for example between about 1 and about 90% by weight of the total weight of the composition, e.g. between about 20 and about 70% by weight of the total weight of the composition. At least 50% by weight of the oxidatively curable portion (i.e. of the binder) in an oxidatively curable alkyd-based resin, i.e. from about 50% by weight to about 100% by weight, is curable alkyd resin. Typically, at least 75% by weight of the binder in an oxidatively curable alkyd-based resin, i.e. from about 75% by weight to about 100% by weight (e.g. from about 90% by weight to about 100% by weight), is curable alkyd resin. According to particular embodiments, about 100% by weight of the binder in an oxidatively curable alkyd-based resin is curable alkyd resin. The balance, if any, of the curable (i.e. binder) component may be, for example, curable acrylate, urethane, polybutadiene and epoxy ester resins. The skilled person is aware that introducing quantities of curable binders other than curable alkyds allows the distinct properties of such binders to be introduced to a controllable degree into the ultimate coating resultant from application of a composition, such as an oxidatively curable composition, which may be made from the formulation of the invention.

As described above, oxidatively curable alkyd resins are a well-understood and indeed dominant binder in many oxidatively curable paints (both for commercial and domestic use) and other coating compositions. They are employed, in particular, in solvent-based coating compositions.

Alkyds (used synonymously herein with alkyd resins) are produced by the condensation, typically polycondensation, of polyols with carboxylic acids or anhydrides. To make them susceptible to the so-called drying process, some alkyd resins (i.e. those that are oxidatively curable, present in the formulation of the invention) are reacted with unsaturated triglycerides or other source of unsaturation. Plant and vegetable oils, such as linseed oil, are frequently used as the source of triglycerides. The term oxidatively curable alkyd resin thus generally refers in the art, and herein, to polyesters modified with fatty acids. As is known in the art, alkyd resins are generally prepared via condensation polymerisation reactions between three types of monomers: (i) one or more polyalcohols (also known as polyols), (ii) one or more polybasic acids (also known as polyacids); and (iii) long chain unsaturated fatty acids or triglyceride oils, which confer upon the alkyds the susceptibility towards curing.

Owing to its presence in naturally occurring oils, glycerol is a widely used polyol in the preparation of alkyds. Other examples of suitable polyhydric alcohols include: pentaerythritol, dipentaerythritol, ethylene glycol, diethylene glycol, propylene glycol, neopentyl glycol, trimethylol propane, trimethylol ethane, di-trimethylol propane and 1,6-hexane diol.

Polycarboxylic acids and the corresponding anhydrides, used to synthesise alkyds, comprise aromatic, aliphatic and cycloaliphatic components, which are generally derived from petrochemical feedstocks. Typical examples of such polyacids include: phthalic acid and its regioisomeric analogues, trimellitic acid, pyromellitic acid, pimelic acid, adipic acid, azelaic acid, sebacic acid, maleic acid, fumaric acid and tetra-hydrophthalic acid.

Suitable so-called drying and semi-drying fatty acids or mixture thereof, useful herein, are typically ethylenically unsaturated conjugated or non-conjugated $C_2$-$C_{24}$ carboxylic acids, such as oleic, ricinoleic, linoleic, linolenic, licanic acid and eleostearic acids or mixture thereof, typically used in the forms of mixtures of fatty acids derived from natural or synthetic oils.

By semi-drying and drying fatty acids is meant fatty acids that have the same fatty acid composition as the oils (i.e. the esters) from which they are derived. The classification of the oils is based on the iodine number: for a drying oil the iodine number is >140; for a semi-drying oil the iodine number is ranging between 125 and 140, and for a non-drying oil the iodine number is <125 (see "Surface Coatings", part 1, Chapman & Hall, London, page 55, 1993).

Typically, oxidatively curable alkyd-based formulations, both generally and according to the first aspect of the invention, are liquids. More typically still, such formulations are solvent-based, that is to say they comprise an organic solvent (which may be a mixture of solvents) for the binder and, in accordance with the first aspect of the invention, the chelant.

In other words, "solvent-based" implies to the skilled person in this context formulations that are based on organic (i.e. non-aqueous) solvents, i.e. comprising an organic solvent as a liquid continuous phase. Examples of suitable solvents include aliphatic (including alicyclic and branched) hydrocarbons, such as hexane, heptane, octane, cyclohexane, cycloheptane and isoparaffins; aromatic hydrocarbons such as toluene and xylene; ketones, e.g. methyl ethyl ketone and methyl isobutyl ketone; alcohols, such as secondary butanol, isopropyl alcohol, n-butyl alcohol and n-propyl alcohol, glycols such as propylene glycol; alcohol ethers and esters, glycol monoethers, such as the monoethers of ethylene glycol and diethylene glycol; monoether glycol acetates, such as 2-ethoxyethyl acetate; N-methylpyrrolidone; as well as mixtures thereof. Isomeric variants are included. Thus, for example, the term hexane embraces mixtures of hexanes. According to particular embodiments of the invention, the solvent is a hydrocarbyl (i.e. hydrocarbon) solvent, e.g. an aliphatic hydrocarbyl solvent, e.g. solvents comprising mixtures of hydrocarbons. Examples include white spirit and solvents available under the trademarks Shellsol, from Shell Chemicals and Solvesso and Exxsol, from Exxon.

Whilst according to many embodiments of the various aspects of the present invention compositions and formulations are solvent-based, water-based alkyd-based resin formulations and coating compositions are also well known and the compositions and formulations described herein may be water-based (i.e. comprise water as a continuous liquid phase). Accordingly, compositions and formulations described herein may be of alkyd-based resin formulations in the form of emulsions, and may thus comprise a suitable emulsifier, as is well known in the art.

When an alkyd-based formulation or composition is referred to herein as "oxidatively curable", it is to be understood that this term is being used to describe a composition susceptible to the reactions that occur between unsaturated groups (e.g. carbon-carbon double bonds) and oxygen from the air, which reactions constitute oxidative curing and are manifested in hardening and formation of solid coatings obtainable from such compositions or formulations. Thus, an oxidatively curable alkyd-based resin formulation is a formulation capable of oxidative curing, but which has not yet been allowed to cure. In contrast, the composition of the third aspect of the invention is directed towards formulations after curing, i.e. when cured. The formation of the desired coating resultant from curing may be accelerated through the use of catalytic drying, for example by transition metal-based driers, in particular transition metal-based driers comprising a chelant of formula (I) or formula (II).

A characteristic feature of the various aspects of the present invention is the use of a chelant of formula (I) or of formula (II). When coordinated to suitable transition metal ions, the resultant complexes accelerate the curing of the oxidatively curable formulation of the invention, which acceleration is absent in the absence of suitable transition metal ions.

The nature of the chelants of formulae (I) and (II) will now be described. It will be understood that more than one such chelant may be used in accordance with the various aspects of the invention. Also combinations of different chelants of formula (I) or (II) and/or with other chelants or siccatives known in the art (such as those described in WO 2008/003652 A1, for example) may be employed. Typically, however, only one kind of chelant will be used.

Chelants of formula (I) and formula (II) are known in the art as bispidons. Those of formula (II) are effectively dimers of those of formula (I) in which moiety Q takes the place of two R1 groups of a chelant of formula (I).

The following features, alone or in combination, as the context permits (i.e. where not conflicting) are typical (but not essential) features of these bispidons to which the present invention relates:

- each D group is either unsubstituted or substituted with one or more, often one, $C_1$-$C_4$alkyl groups;
- each D group is the same;
- each D group is an optionally substituted thiazol-2-yl or thiazol-4-yl;
- each D group is unsubstituted thiazol-2-yl or thiazol-4-yl;
- each E group is the same;
- each E group is an optionally substituted pyridin-2-yl, an optionally substituted thiazol-2-yl, or an optionally substituted thiazol-4-yl;
- each E group is unsubstituted pyridin-2-yl, unsubstituted thiazol-2-yl, or unsubstituted thiazol-4-yl;
- each E group is unsubstituted pyridin-2-yl;
- Q is selected from —$CH_2CH_2$—, —$CH_2CH_2CH_2$— and —$CH_2CHOHCH_2$—, each of which is optionally $C_1$-$C_6$alkyl-substituted;
- Q is an unsubstituted —$CH_2CH_2$—, —$CH_2CH_2CH_2$— or —$CH_2CHOHCH_2$— group;
- Q is an unsubstituted —$CH_2CH_2$— or —$CH_2CH_2CH_2$— group;
- for formula (I) each R1 and R2 group is independently selected from $C_1$-$C_{24}$alkyl, $C_6$-$C_{10}$aryl, $C_{6-10}$aryl$C_1$-$C_6$alkyl, $C_5$-$C_{10}$heteroaryl$CH_2$ and $CH_2CH_2N(R8)(R9)$, whereby —N(R8)(R9) is selected from —$NMe_2$, —$NEt_2$, —$N(i-Pr)_2$,

- for formula (I) in case any R1 or R2 group is independently a $C_1$-$C_{24}$alkyl, a $C_6$-$C_{10}$aryl, or a $C_{6-10}$aryl$C_1$-$C_6$alkyl group, it is more typically independently selected from $C_1$-$C_{18}$alkyl and $C_6$-$C_{10}$aryl$C_1$-$C_6$alkyl, and even more typically independently selected from: $C_1$-$C_8$alkyl and $C_6$-$C_{10}$aryl$CH_2$;
- for formula (I) in case any R1 or R2 is independently a $C_5$-$C_{10}$heteroaryl$CH_2$ group, it (and often R1) is preferably selected from pyridin-2-ylmethyl, pyrazin-2-ylmethyl, quinolin-2-ylmethyl, pyrazol-1-ylmethyl, pyrazol-3-ylmethyl, pyrrol-2-ylmethyl, imidazol-2-ylmethyl, imidazol-4-ylmethyl, benzimidazol-2-ylmethyl, pyrimidin-2-ylmethyl, 1,2,3-triazol-1-ylmethyl, 1,2,3-triazol-2-ylmethyl, 1,2,3-triazol-4-ylmethyl, 1,2,4-triazol-3-ylmethyl, 1,2,4-triazol-1-ylmethyl and thiazol-2-ylmethyl, often pyridin-2-ylmethyl, quinolin-2-ylmethyl, imidazol-2-ylmethyl, thiazol-2-ylmethyl and thiazol-4-ylmethyl;
- for formula (I) often one of the R1 and R2 groups (particularly often R2) is $C_1$-$C_{24}$alkyl or $C_{6-10}$aryl$C_1$-$C_6$alkyl, whilst the other of the R1 and R2 groups (particularly often R1) is a $C_5$-$C_{10}$heteroaryl$CH_2$ group or $CH_2CH_2N(R8)(R9)$, whereby —N(R8)(R9) is selected from —$NMe_2$, —$NEt_2$, —$N(i-Pr)_2$,

- for formula (I) one of the R1 and R2 groups (particularly often R2) is most typically $C_1$-$C_{18}$alkyl, with $C_1$-$C_{12}$alkyl more preferred, $C_1$-$C_8$alkyl even more preferred and with $CH_3$ being most preferred; and the other R1 or R2 group (particularly often R1) typically an optionally substituted pyridin-2-ylmethyl, with unsubstituted pyridin-2-ylmethyl being most typical, or is selected from $CH_2CH_2N(R8)(R9)$, whereby —N(R8)(R9) is selected from —$NMe_2$, —$NEt_2$, —$N(i-Pr)_2$,

- for formula (I), R1 is different from R2, whereby often R1 is pyridin-2-ylmethyl and R2 is methyl, or R1 is methyl and R2 is pyridin-2-ylmethyl;
- formula (II) each R2 group is independently selected from $C_1$-$C_{24}$alkyl, $C_6$-$C_{10}$aryl, $C_{6-10}$aryl$C_1$-$C_6$alkyl, $C_5$-$C_{10}$heteroaryl$CH_2$ and $CH_2CH_2N(R8)(R9)$, whereby —N(R8)(R9) is selected from —$NMe_2$, —$NEt_2$, —$N(i-Pr)_2$,

- for formula (II) more typically both R2 groups are identical;
- for formula (II) in case any R2 group is independently a $C_1$-$C_{24}$alkyl, a $C_6$-$C_{10}$aryl, or a $C_{6-10}$aryl$C_1$-$C_6$alkyl group, it is more typically independently selected from $C_1$-$C_{18}$alkyl and $C_6$-$C_{10}$aryl$C_1$-$C_6$alkyl, and even more typically independently selected from: $C_1$-$C_8$alkyl and $C_6$-$C_{10}$aryl$CH_2$;
- for formula (II) in case any R2 is independently a $C_5$-$C_{10}$heteroaryl$CH_2$ group, it is preferably selected from pyridin-2-ylmethyl, pyrazin-2-ylmethyl, quinolin-2-ylmethyl, pyrazol-1-ylmethyl, pyrazol-3-ylmethyl, pyrrol-2-ylmethyl, imidazol-2-ylmethyl, imidazol-4-ylmethyl, benzimidazol-2-ylmethyl, pyrimidin-2-ylmethyl, 1,2,3-triazol-1-ylmethyl, 1,2,3-triazol-2-ylmethyl, 1,2,3-triazol-4-ylmethyl, 1,2,4-triazol-3-ylmethyl, 1,2,4-triazol-1-ylmethyl and thiazol-2-ylmethyl, often pyridin-2-ylmethyl, quinolin-2-ylmethyl, imidazol-2-ylmethyl, thiazol-2-ylmethyl and thiazol-4-ylmethyl;
- for formula (II) in case any R2 is $CH_2CH_2N(R8)(R9)$, it is preferably selected from —$NMe_2$, —$NEt_2$, —$N(i-Pr)_2$,

for formula (II), each R2 is the same, often pyridin-2-ylmethyl;

groups R3 and R4 are of the formula —C(O)OR5 wherein each R5 is independently selected from hydrogen, $C_1$-$C_8$alkyl and $C_{6-10}$aryl (although each R5 is often the same);

groups R3 and R4 are of the formula —C(O)OR5 wherein each R5 is independently selected from $C_1$-$C_8$alkyl and $C_{6-10}$aryl (although each R5 is often the same);

groups R3 and R4 are of the formula —C(O)OR5 wherein each R5 is independently $C_1$-$C_4$alkyl (although each R5 is often the same);

groups R3 and R4 are the same and often —C(O)OCH$_3$;

X is selected from C=O, —[C(R6)$_2$]$_{0-3}$- wherein each R6 is independently selected from hydrogen, hydroxyl, $C_1$-$C_4$alkoxy;

X is selected from C=O and —[C(R6)$_2$]- wherein each R6 is independently selected from hydrogen, hydroxyl and $C_1$-$C_4$alkoxy (although each R6 is often the same);

X is selected from C=O and —[C(R6)$_2$]- wherein each R6 is independently selected from hydroxyl and $C_1$-$C_4$alkoxy (although each R6 is often the same); and X is selected from C=O, C(OH)$_2$ and C(OCH$_3$)$_2$, where C=O or C(OH)$_2$ are most typical.

The skilled person is aware of strategies for synthesising bispidons, and is therefore able to synthesise the bispidons described herein without undue burden. For example, in addition to the exemplification herein, reference may be made to the references described in the introduction section and publications by P Comba and co-workers (see for example H Börzel et al. (*Inorganica Chemica Acta*, 337, 407-419 (2002) and *Inorg. Chem.*, 41, 5440-5452 (2002)) and P Comba et al. (*Angew. Chem. Int. Ed. Engl.*, 42, 4536-4540 (2003)).

As is indicated above, X is most typically C=O or C(OH)$_2$. As the skilled person is aware, the gem-diol C(OH)$_2$ in this context represents a hydrated ketone group. Generally, there exists a rapid dynamic equilibrium between gem-diols and their parent ketone groups, making gem-diols difficult to isolate. As the skilled person is aware, however, it is possible for ketones or gem-diols to be found in complexed bispidons. For example, complexes prepared in anhydrous solutions may comprise ketone-containing bispidons whereas those prepared in less dry conditions may comprise gem-diols (see for example H Börzel et al. (*Inorganica Chemica Acta*, supra) and P Comba et al. (*Angew. Chem. Int. Ed. Engl.*, supra). Accordingly, where reference is made herein to complexed bispidons (i.e. with suitable transition metal ions, as described herein), it is to be understood that such references extend to complexes comprising bispidons with both X=C=O and the hydrates thereof (i.e. wherein X is C(OH)$_2$).

Where the synthesis of a bridged chelant (i.e. a chelant of formula (II) is desired), the skilled person is as aware of ways in which these may be made as of synthetic strategies for accessing chelants of formula (I). In particular, reference may be made to the teachings in H Börzel et al. (*Inorg. Chem.*, 41, 5440-5452 (2002)) and P Comba et al. (*Angew. Chem. Int. Ed. Engl.*, 42, 4536-4540 (2003)). For example, the skilled person will recognise that, if Q=1,3-propylene (—CH$_2$CH$_2$CH$_2$—), that by reacting the appropriate piperidone precursor, formaldehyde and 1,3-diaminopropane, a desired bridged bispidon chelant of formula (II) may be obtained.

According to specific embodiments of the 1$^{st}$ to 3$^{rd}$ 5$^{th}$ and 6$^{th}$ aspects of the invention, the bispidon according to formula (I) is one of the following chelants: dimethyl 2,4-di(thiazol-2-yl)-3-methyl-7-(pyridin-2-ylmethyl)-3,7-diaza-bicyclo[3.3.1]nonan-9-one-1,5-dicarboxylate, dimethyl 2,4-di(thiazol-4-yl)-3-methyl-7-(pyridin-2-ylmethyl)-3,7-diaza-bicyclo[3.3.1]nonan-9-one-1,5-dicarboxylate, and the analogous 3,7 isomeric variants: dimethyl 2,4-di(thiazol-2-yl)-3-(pyridin-2-ylmethyl)-7-methyl-3,7-diaza-bicyclo [3.3.1]nonan-9-one-1,5-dicarboxylate, and dimethyl 2,4-di(thiazol-4-yl)-3-(pyridin-2-ylmethyl)-7-methyl-3,7-diaza-bicyclo[3.3.1]nonan-9-one-1,5-dicarboxylate. Also preferred are tetradentate bispidons, in particular dimethyl 2,4-di(thiazol-2-yl)-3,7-dimethyl-3,7-diaza-bicyclo[3.3.1] nonan-9-one-1,5-dicarboxylate and dimethyl 2,4-di(thiazol-4-yl)-3,7-dimethyl-3,7-diaza-bicyclo[3.3.1]nonan-9-one-1, 5-dicarboxylate.

According to other specific embodiments, the bispidon is of formula (II) wherein:

E=pyridin-2-yl, R2=pyridin-2-ylmethyl; X=(C=O); R3=R4=—C(O)OCH$_3$ and Q=CH$_2$CH$_2$ (1,2-di{1,5-di(methoxycarbonyl)-3-(pyridin-2-ylmethyl)-9-oxo-2,4-di(pyridin-2-yl)-3,7-diazabicyclo[3.3.1]nonan-7-yl}ethane);

E=pyridin-2-yl, R2=pyridin-2-ylmethyl; X=(C=O); R3=R4=—C(O)OCH$_3$ and Q=CH$_2$CH$_2$CH$_2$ (1,3-di{1, 5-di(methoxycarbonyl)-3-(pyridin-2-ylmethyl)-9-oxo-2,4-di(pyridin-2-yl)-3,7-diazabicyclo[3.3.1]nonan-7-yl}propane);

E=pyridin-2-yl, R2=methyl; X=(C=O); R3=R4=—C(O)OCH$_3$ and Q=CH$_2$CH$_2$: (1,2-di{1,5-di(methoxycarbonyl)-3-methyl-9-oxo-2,4-di(pyridin-2-yl)-3,7-diazabicyclo[3.3.1]nonan-7-yl}ethane); or E=pyridin-2-yl, R2=methyl; X=(C=O); R3=R4=—C(O)OCH$_3$ and Q=CH$_2$CH$_2$CH$_2$ (1,3-di{1,5-di(methoxycarbonyl)-3-methyl-9-oxo-2,4-di(pyridin-2-yl)-3,7-diazabicyclo[3.3.1]nonan-7-yl}propane).

Of these chelants according to formula (I) or formula (II), the most preferred are dimethyl 2,4-di(thiazol-2-yl)-3-methyl-7-(pyridin-2-ylmethyl)-3,7-diaza-bicyclo[3.3.1] nonan-9-one-1,5-dicarboxylate, dimethyl 2,4-di(thiazol-2-yl)-3-(pyridin-2-ylmethyl)-7-methyl-3,7-diaza-bicyclo [3.3.1]nonan-9-one-1,5-dicarboxylate, dimethyl 2,4-di(thiazol-4-yl)-3-methyl-7-(pyridin-2-ylmethyl)-3,7-diaza-bicyclo[3.3.1]nonan-9-one-1,5-dicarboxylate, dimethyl 2,4-di(thiazol-4-yl)-3-(pyridin-2-ylmethyl)-7-methyl-3,7-diaza-bicyclo[3.3.1]nonan-9-one-1,5-dicarboxylate, 1,2-di{3-(pyridin-2-ylmethyl)-9-oxo-2,4-di(pyridin-2-yl)-(3,7-diazabicyclo[3.3.1]nonan-7-yl)-1,5-di(carboxylate methyl ester)}ethane and 1,3-di{3-(pyridin-2-ylmethyl)-9-oxo-2,4-di(pyridin-2-yl)-(3,7-diazabicyclo[3.3.1]nonan-7-yl)-1,5-di(carboxylate methyl ester)}propane.

The chelant of formula (I) or formula (II) is typically present in formulations according to the present invention in concentrations of from 0.00001 to 0.5% by weight, often from 0.00005 to 0.1% by weight.

Where percentages by weight are referred to herein (wt % or % w/w), these mean, unless a context clearly dictates to the contrary, percentages by weight with respect to the binder component (i.e. the alkyd-based resin and any other binders present). With an oxidatively curable alkyd-based coating formulation, for example, the combined weights of the binders are those with respect to which weight percentages herein are based. For example, where a formulation according to the first aspect of the invention comprises 0.00005% by weight of chelant of formula (I) or formula (II), this is with respect to the weight of the curable components of the composition (i.e. the weight of the binder(s)).

Often, formulations of the first aspect of the invention will comprise a complex of the chelant of formula (I) with a suitable transition metal ion. However, this need not necessarily be so. This is because, as is described in WO 2014/122433 A1 (Chemsenti Limited, now Catexel Technologies Limited), there is technical advantageousness in providing an oxidatively curable alkyd-based resin formulation comprising a chelant (used interchangeably herein with the term "chelating agent"), here of formula (I) or formula (II), which formulation is essentially absent at least iron, manganese, cobalt, vanadium and copper ions. These ions, if present in the formulation, can form together with the chelant a metal drier capable of accelerating oxidative curing.

A manufacturer of an alkyd-based resin formulation suitable for oxidative curing can thus include a chelant of formula (I) or formula (II) in an amount appropriate for a given oxidatively curable alkyd-based resin formulation. Each type of oxidatively curable alkyd-based resin can, and typically does, have different sensitivity towards radical curing and may thus require a particular concentration of a metal drier for optimal curing. However, to determine the appropriate concentration in practice is not straightforward, since a metal drier, for example an iron-based catalyst, can initiate radical curing before the coating composition (e.g. paint) comprising an oxidatively curable alkyd-based resin formulation (and other components) can be applied, leading to undesirable degradation and/or hardening of the resin formulation. In contrast, a manufacturer of an oxidatively curable alkyd-based resin formulation, as opposed to the manufacture of a fully formulated oxidatively curable coating composition comprising such an oxidatively curable alkyd-based resin formulation, can determine the optimum amount of metal drier for a given alkyd-based resin formulation and add to batches of it a suitable amount of chelant of formula (I) or formula (II) (but not the transition metal ions that allow formation of a catalytically active drier, which are often, but not necessarily, iron, manganese, vanadium or copper ions). An appropriate quantity of transition metal ions can then be added to the resultant formulation by, for example, a manufacturer of a coating composition, along with other components to make a fully formulated oxidatively curable coating composition.

Mixing of appropriate chelants of formula (I) or (II) with alkyd-based resin formulations in the essential absence of at least iron, manganese, cobalt, vanadium and copper ions which, if present, render these chelants catalytically active as metal driers, affords formulations at least less susceptible to skinning or instability without the requirement to add antiskinning agents and/or to take other specific measures to avoid skinning. Such formulations thus constitute particular embodiments of the first aspect of the invention.

The embodiments of the formulation of the first aspect of the invention that are essentially absent at least iron, manganese, cobalt, vanadium and copper ions comprise less than 0.00005% by weight of at least ions of each of iron, manganese, cobalt, vanadium and copper. By this is meant that the formulation of the invention is absent 0.00005% by weight manganese ions, absent 0.00005% by weight iron ions, absent 0.00005% by weight cobalt ions, absent 0.00005% by weight vanadium ions and absent 0.00005% by weight copper ions. An appropriate quantity of suitable transition metal cations (e.g. ions of one or more of iron, manganese, vanadium and copper, more typically of iron or manganese and most typically of iron) can be added after preparation of such a formulation, for example when introducing optional additional components to form an oxidatively curable coating composition.

Particular formulations of the invention can, if desired, comprise less than 0.00005% by weight of each of at least iron, manganese, cobalt, vanadium and copper ions. Still other embodiments of formulations of the invention comprise less than 0.00005% by weight of each of iron, manganese, cobalt, vanadium, copper, titanium, molybdenum, tungsten, cerium and zirconium.

Ideally, embodiments of the formulation of the invention with concentrations of specific transition metal ions of less than 0.00005% by weight are absent any of the transition metal ions specified. Obviously, however, this is in practice impossible to achieve. Accordingly, these formulations are preferably absent of the transition metal ions specified to the greatest extent practicable.

In order to make, in accordance with a method of the second aspect of the invention, a formulation according to the first aspect of the invention, a composition comprising an oxidatively curable alkyd-based resin is contacted with a composition comprising a chelant of formula (I) or of formula (II). The formulation comprising the chelant of formula (I) or of formula (II) that is contacted with the formulation comprising the alkyd-based resin may, in some embodiments, comprise a transition metal ion-containing complex comprising the chelant. In other embodiments, the formulation comprising the chelant of formula (I) or of formula (II) is not part of a transition metal ion-containing complex, in which case a source of transition metal ions may, if wished, be added afterwards (or indeed have been formulated together with the alkyd-based resin before addition of the chelant) so as to form a complex comprising the chelant of formula (I) or of formula (II) in situ (i.e. within the alkyd-based resin formulation). Both of these different types of embodiments are described below.

The typical molar ratio between any transition metal ions and the chelant of formula (I) is between about 0.1:1 and about 10:1, often between about 0.3:1 and about 3:1. Often, the molar ratio between chelant and transition metal ions will be about 1:1. However, this need not necessarily be the case. Without being bound to theory, an excess of transition metal ions may be beneficial to allow some adsorption on solid particles without losing too much siccative activity. On the other hand, a stoichiometric excess of chelant may be beneficial to improve regeneration of catalytically active species during curing, which can lead to improved drying (i.e. curing) performance despite using a lower quantity of transition metal ions. Using a stoichiometric excess of chelant can also be advantageous by reducing the intensity of coloured metal complexes. The skilled person will be able to take into account these considerations when preparing oxidatively curable coating compositions, for example formulations of the invention.

In complexes comprising a chelant of formula (II), the number of metal ions per chelant molecule may be either 1 or 2. Since chelants of formula (II) comprise two tetradentate or pentadentate nitrogen donor moieties, each tetradentate or pentadentate nitrogen donor moiety may bind to one transition metal ion, such as an iron or a manganese or ion. Thus, where each chelating moiety binds a metal ion, the molar ratio in such complexes of chelant of formula (II) to metal ions is 1:2. Alternatively, complexes or species may be obtained in which one chelant of formula (II) binds to only one metal ion, for example if a molar excess of chelant of formula (II) is employed. In this way, the complex may be obtained having a molar ratio of chelant of formula (II) to metal ion of 1:1, with one of the tetradentate or pentadentate nitrogen donor moieties (chelating units) not participating in coordination to a transition metal ion. In view of this, the typical molar ratio between transition metal ions and the chelant if of formula (II) is between about 0.1:1 and about 20:1, often between about 0.3:1 and about 6:1. Often, the molar ratio between chelant and transition metal ions will be between about 1:1 and about 1:2.

The contacting of the method of the first aspect of the invention may be during formulation of fully formulated oxidatively curable alkyd-based resin coating compositions (described below), particularly if the chelant of formula (I) or formula (II) is part of a complex comprising a suitable transition metal ion (for example one or two suitable transition metal ions).

If the chelant of formula (I) or formula (II) introduced as a transition metal ion-containing complex, the complex may be prepared by contacting the chelant of formula (I) or formula (II) with a suitable transition metal salt in a suitable solvent, by which is meant that either or both of the chelant and transition metal salt may be in a suitable solvent prior to contact with each other. The salt can be a soap. The resultant complex-containing mixture may then be contacted with a composition comprising an oxidatively curable alkyd-based resin, which is typically dissolved in an organic solvent described above when describing solvent-based alkyd-based formulations (or emulsified in a water-based liquid such as those described above when describing water-based alkyd-based formulations).

Often, the metal salt used will be an iron or a manganese salt, typically of a divalent or trivalent redox state. Upon contacting the manganese or iron (or other transition metal) salt with the chelant, formation of manganese- or iron-chelant complexes (or other transition metal-chelant complexes) takes place.

The transition metal salt used can be a solid, a suspension, or as a solution in a variety of solvents. Typically, the salt comprises an iron (II), iron (III) ion manganese (II), or manganese (III), although other salts, e.g. manganese (IV) salts may also be used. Such iron or manganese (or other metal ion) salts can be added as solids, suspensions, or as solutions in a variety of solvents. The invention contemplates use of a mixture of metal salts although a single salt is typically used.

In all aspects of the present invention, where the chelant is part of a complex, the complex is typically an iron complex, generally one comprising one Fe(II) ion (where the chelant is of formula (I), or two Fe(II) ions (where the chelant is of formula (II)).

Adding the chelant as a solution can be advantageous in permitting improved and/or easier mixing with the (solution of) binder(s). It may be beneficial to dilute chelant in a suitable solvent before adding to the binder if it is wished to introduce a very small amount of chelant, so greater accuracy of dosing can be achieved. Depending on the properties of the chelant and the desired resin-chelant formulation, suitable solvents include aliphatic hydrocarbons, such as heptanes, water, alcohols, such as ethanol or propylene glycol, or mixtures thereof. The skilled person will be able to easily formulate such solutions, generally using solvent such as those described above.

It will be understood that there is no particular limitation as to the source of the transition metal ions. Typically, however, salts are selected from the group consisting of optionally hydrated $FeCl_2$, $FeCl_3$, $Fe(NO_3)_3$, $FeSO_4$, $(Fe)_2(SO_4)_3$, $Fe(acetylacetonate)_2$, $Fe(acetylacetonate)_3$, $Fe(R^{10}COO)_3$ (including $Fe(acetate)_3$), $Fe(R^{10}COO)_2$ (including $Fe(acetate)_2$), $MnCl_2$, $MnBr_2$, $Mn(NO_3)_2$, $MnSO_4$, $Mn(acetylacetonate)_2$, $Mn(acetylacetonate)_3$ $Mn(R^{10}COO)_3$ (including $Mn(acetate)_3$) and $Mn(R^{10}COO)_2$, wherein $R^{10}$ is selected from a $C_1$-$C_{24}$ alkyl. Where the salt comprises two or three $R^{10}$ groups, these can be the same or different although they will typically be the same. Often, the salt (including those referred to in the following three paragraphs) is an iron salt, particularly often an iron (II) salt. The alkyl moieties, by which is meant saturated hydrocarbyl radicals, may be straight-chain or comprise branched and/or cyclic portions. Indeed, throughout the specification, where reference is made to alkyl, unless the context dictates to the contrary, this means a $C_{1-24}$alkyl, which may be straight-chain or branched and may be cycloalkyl or comprise a cyclic portion (e.g. alkyl may be cyclohexylmethyl), for example $C_{1-10}$alkyl or $C_{1-6}$alkyl, e.g. methyl.

Often, the iron or manganese salt is selected from $Fe(R^{10}COO)_2$ or $Mn(R^{10}COO)_2$, particularly with $R^{10}COO$ (⁻) being selected from acetate, octanoate, 2-ethylhexanoate, neodecanoate (3,3,5,5-tetramethylhexanoate), and naphthenate. Also often, the iron or manganese salt is optionally hydrated $iron(chloride)_2$, $iron(nitrate)_3$, iron sulfate, $manganese(chloride)_2$, $manganese(nitrate)_2$ or manganese sulfate used.

The term optionally hydrated is well known in the art. Metal salts often contain water molecules within a crystal lattice, which will remain present unless the hydrated metals salts are subjected to specific drying steps by heating or drying under reduced pressure. However, partially or fully dehydrated metal salts can also be used. For example, iron (II) chloride, manganese (II) acetate and manganese (II) chloride can be bought as tetrahydrate salts or as dehydrate salts. Iron (III) chloride can be purchased as the anhydrous salt as well as the hexahydrate salt. Commercial manganese sulfate is available in both tetrahydrate and monohydrate forms.

Often these transition metal salts are commercially available as solutions, particularly if they are of the formulae $Fe(R^{10}COO)_2$ or $Mn(R^{10}COO)_2$ described above, for example in hydrocarbon solutions to facilitate dissolution in the solvent-based curable compositions such as paint formulations. However, other solvents may also be used, including alcohols and water (or aqueous solutions), especially for chloride, sulfate and acetate salts of iron and manganese ions.

Particularly often, an iron salt is used, which, for example is selected from $iron(chloride)_2$, $iron(acetate)_2$, $iron(octanoate)_2$, $iron(naphthenate)_2$, $iron(2-ethylhexanoate)_2$ and $iron(neodecanoate)_2$. The invention also contemplates use of a mixture of different redox states of the metal ions with the same counterion, for example a mixture of $iron(neodecanoate)_2$ and $iron(neodecanoate)_3$.

Formulations of the invention that comprise less than 0.00005% by weight of ions of each of at least iron, manganese, cobalt, vanadium and copper may be prepared by contacting a chelant of formula (I) or (II) with (e.g. adding it to) an oxidatively curable alkyd-based binder, typically dissolved in an organic solvent described above (or emulsified in a water-based liquid), as described above. The chelant may be added as a pure material to the resin(s), or as a solution. Adding the chelant as a solution can be advantageous in permitting improved and/or easier mixing with the (solution of) binder(s). It may be beneficial to dilute chelant in a suitable solvent before adding to the binder if it is wished to introduce a very small amount of chelant, so greater accuracy of dosing can be achieved. Depending on the properties of the chelant and the desired resin-chelant formulation, suitable solvents include aliphatic hydrocarbons, such as heptanes, water, alcohols, such as ethanol or propylene glycol, or mixtures thereof. The skilled person will be able to easily formulate such solutions, generally using a solvent such as those described above.

Thus, as described herein, formulations of the invention comprising transition metal ion-containing complexes of the chelant of formula (I) or formula (II) can be prepared, either by contacting an alkyd-based resin composition with such a complex directly, or by contacting an alkyd-based resin composition with chelant that is not part of such a complex and then adding to the resultant formulation a source of transition metal ions. As a still further embodiment of the method of the second aspect of the invention, an alkyd-based resin composition comprising suitable transition metal ions may be contacted with chelant of formula (I) or formula (II). Generally, formulations of the invention comprising transition metal ions comprise a concentration of between about 0.00007% by weight and about 0.05% by weight, for example about 0.0001 by weight and about 0.02% by weight e.g. between about 0.0005% by weight and about 0.01% by weight, of the suitable transition metal ion, such as those described immediately below.

Transition metal ions to which the chelants of formula (I) and (II) may coordinate, to provide metal driers (transition metal ion-containing complexes that can accelerate curing of the oxidatively curable alkyd-based resin in the formulation of the invention may be, for example iron, manganese, vanadium, copper, titanium, molybdenum, tungsten, cerium and zirconium ions, more typically iron, manganese, vanadium and copper ions, still more typically iron or manganese ions, or mixtures of any these metal ions. The valency of the metal ions may range from +1 to +6, often from +2 to +5. Examples include metal ions selected from the group consisting of Fe(II), Fe(III), Fe(IV), Fe(V), Mn(II), Mn(III), Mn(IV), Mn(V), Cu(I), Cu(II), Cu(II), Ti(II), Ti(III), Ti(IV), V(II), V(III), V(IV), V(V), Mo(II), Mo(III), Mo(IV), Mo(V), Mo(VI), W(IV), W(V), W(VI), Ce(III), Ce(IV) and Zr(IV), for example metal ions selected from the group consisting of Fe(II), Fe(III), Fe(IV), Fe(V), Mn(II), Mn(III), Mn(IV), Mn(V), Cu(I), Cu(II), Cu(III), V(II), V(III), V(IV) and V(V), for example metal ions selected from the group consisting of Fe(II), Fe(III), Mn(II), Mn(III) and Mn(IV). Most often the metal ions are selected from the group consisting of Fe(II) and Fe(III).

In complexes comprising the chelant of formula (I) or (II), the number of metal ions per chelant molecule will depend on both the chelant molecule and on the presence of other ligands in the complex, in particular coordinating ligands, including coordinating ligands capable of bridging metal ions. For example, if a chelant of formula (I) contains only four or five nitrogen donor atoms, the complex containing it will typically contain one metal ion per chelant molecule. Complexes comprising more than one metal ion (and thus more than one chelant molecule of formula (I)) may be formed if metal ions are bridged by, for example, oxide or hydroxyl anions, or carboxylate groups, giving rise to dinuclear or multinuclear complexes. Typically, however, the molar ratio between metal ions and chelants of formula (I) in complexes of them is about 1:1 (for example wherein the ratio 1:1 denotes a ratio of between about 0.95 and 1.05 (i.e. 0.95:1-1.05:1).

In complexes comprising the chelant of formula (II), the molar ratio between the metal ions and chelants of formula (II) is typically between about 1:1 and about 2:1, for example about 1:1 (often 0.95:1-1.05:1) or about 2:1 (often 1.9-2.1).

Complexes comprising a chelant of formula (I) or formula (II) may, for example, be of the generic formula (III):

$$[M_a L_k X_n] Y_m \quad (III)$$

in which:
M represents a metal ion selected from Fe(II), Fe(III), Fe(IV), Fe(V), Mn(II), Mn(III), Mn(IV), Mn(V), Cu(I), Cu(II), Cu(III), Ti(II), Ti(III), Ti(IV), V(II), V(III), V(IV), V(V), Mo(II), Mo(III), Mo(IV), Mo(V), Mo(VI), W(IV), W(V), W(VI), Ce(II), Ce(IV), Zr(IV);
each X independently represents a coordinating species selected from any mono-, bi-, or tri-charged anions and any neutral molecule able to coordinate a metal ion M in a mono-, bi- or tridentate manner;
each Y is independently a non-coordinating counterion;
a represents an integer from 1 to 10;
k represents an integer from 1 to 10;
n represents an integer from 1 to 10;
m represents an integer from 0 to 20; and
L represents a chelant of formula (I) or of formula (II), or a hydrate thereof.

According to particular embodiments of formula (III), alone or in combination:
M represents a metal ion selected from Fe(II), Fe(III), Mn(II), Mn(III) and Mn(IV);
X represents a coordinating species selected from $O^{2-}$, $[R^{11}BO_2]^{2-}$, $R^{11}COO^-$, $[R^{11}CONR^{11}]^-$, $OH^-$, $NO_3^-$, NO, $S^{2-}$, $R^{11}S^-$, $PO_4^{3-}$, $HPO_4^{2-}$, $H_2PO_4^-$, $[PO_3 OR^{11}]^{3-}$, $H_2O$, $CO_3^{2-}$, $HCO_3^-$, $R^{11}OH$, $NR^{11}R^{12}R^{13}$, $R^{11}OO^-$, $O_2^{2-}$, $O_2^-$, $R^{11}CN$, $Cl^-$, $Br^-$, $I^-$, $OCN^-$, $SCN^-$, $CN^-$, $N_3^-$, $F^-$, $R^6O^-$, $ClO_4^-$, $CF_3SO_3^-$;
Y represents a counterion selected from $ClO_4^-$, $CF_3SO_3^-$, $[B(R^{11})_4]^-$, $[FeCl_4]^-$, $PF_6^-$, $R^{11}COO^-$, $NO_3^-$, $R^6O^-$, $N^+ R^{11} R^{12}R^{13}R^{14}$, $Cl^-$, $Br^-$, $I^-$, $F^-$, $S_2O_6^{2-}$, $OCN^-$, $SCN^-$, $H_2O$, $BF_4^-$, $SO_4^{2-}$;
$R^{11}$, $R^{12}$, $R^{13}$ and $R^{14}$ each independently represents hydrogen, optionally substituted alkyl or optionally substituted aryl;
a represents an integer from 1 to 4;
k represents an integer from 1 to 10;
n represents an integer from 1 to 4; and
m represents an integer from 1 to 8.

As used herein, within the definitions provided above for formula (III) and elsewhere, unless a context expressly dictates to the contrary, the following definitions apply:
By alkyl is meant herein a saturated hydrocarbyl radical, which may be straight-chain, cyclic and/or branched. By alkylene is meant an alkyl group from which a hydrogen atom has been formally abstracted. Typically, alkyl and alkylene groups will comprise from 1 to 25 carbon atoms, more usually 1 to 10 carbon atoms, more usually still 1 to 6 carbon atoms. The simplest alkylene group is methylene (—$CH_2$—).
Aromatic moieties may be polycyclic, i.e. comprising two or more fused (carbocyclic) aromatic rings. Typically, aryl groups will comprise from 1 to 14 carbon atoms. The simplest aryl group is phenyl. Naphthalene and anthracene are examples of polycyclic aromatic moieties.
Heteroaromatic moieties are aromatic, heterocyclic moieties, which comprise one or more heteroatoms, typically oxygen, nitrogen or sulfur, often nitrogen, in place of one or more ring carbon atoms and any hydrogen atoms attached thereto, in a corresponding aromatic moiety. Heteroaromatic moieties, for example, include pyridine, furan, pyrrole and pyrimidine. Benzimidazole is an example of a polycyclic heteroaromatic moiety.

Aryl radicals and arylene diradicals are formed formally by abstraction of one and two hydrogen atoms respectively from an aromatic moiety. Thus, phenyl and phenylene are the aryl radical and arylene diradical corresponding to benzene. Analogously, pyridyl and pyridylene (synonymous with pyridinediyl) are the heteroaryl radical and heteroarylene diradical corresponding to pyridine. Unless a context dictates to the contrary, pyridyl and pyridylene are typically 2-pyridyl and pyridine-2,6-diyl respectively.

By heterocycloalkane is meant a cycloalkane, typically a $C_{5-6}$cycloalkane, in which one or more $CH_2$ moieties are replaced with heteroatoms, typically selected from the group consisting of nitrogen, oxygen and sulfur. Where a heteroatom is nitrogen, it will be understood that the $CH_2$ moiety is formally replaced with NH, not N. By heterocycloalkyl is meant herein a radical formed formally by abstraction of a hydrogen atom from a heterocycloalkane. Typical examples of heterocycloalkyl groups are those in which the heterocycloalkyl is formed formally by abstraction of a hydrogen atom from the nitrogen atom. Typical heterocycloalkyl groups include pyrrolidin-1-yl, piperidin-1-yl and morpholin-4-yl, i.e. in which the heterocycloalkyl is formed formally by abstraction of a hydrogen atom from the nitrogen atom of the parent heterocycloalkane.

By arylalkyl is meant aryl-substituted alkyl. Analogously, by aminoalkyl is meant amino-substituted alkyl, by hydroxyalkyl is meant hydroxy-substituted alkyl and so on.

Various alkylene bridges are described herein. Such alkylene bridges are typically although not necessarily straight chain alkylene bridges. They may, however, be cyclic alkylene groups (e.g. a $C_6$alkylene bridge may be cyclohexylene, and if so is typically cyclohexyl-1,4-ene). Where a bridge is, for example, a $C_{6-10}$arylene bridge, this may be, for example, phenylene or the corresponding arylene formed by abstraction of two hydrogen atoms from naphthalene. Where a bridge comprises one or two $C_{1-3}$alkylene units and one $C_{6-10}$arylene unit, such bridges may be, for example, —$CH_2C_6H_4CH_2$— or —$CH_2C_6H_4$—. Where present, phenylene is typically phenyl-1,4-ene. It will be understood that each of these bridges may be optionally substituted one or more times, for example once, with independently selected $C_{1-24}$alkyl (e.g. $C_{1-18}$ alkyl) groups.

By alkyl ether is meant a radical of the formula -alkylene-O-alkyl, wherein alkylene and alkyl are as herein defined.

Where an alkyl or aryl group is optionally substituted, this may be, unless a context expressly dictates otherwise, with one or more substituents independently selected from the group consisting of -halo, —OH, —OR$^{15}$, —NH$_2$, —NHR$^{15}$, —N(R$^{15}$)$_2$, —N(R$^{15}$)$_3^+$, —C(O)R$^{15}$, —OC(O)R$^{15}$, —CO$_2$H, —CO$_2^-$, —CO$_2$R$^{15}$, —C(O)NH$_2$, —C(O)NHR$^{15}$, —C(O)N(R$^{15}$)$_2$, -heteraryl, —R$^{15}$, —SR$^{15}$, —SH, —P(R$^{15}$)$_2$, —P(O)(R$^{15}$)$_2$, —P(O)(OH)$_2$, —P(O)(OR$^{15}$)$_2$, —NO$_2$, —SO$_3$H, —SO$_3^-$, —S(O)$_2$R$^{15}$, —NHC(O)R$^{15}$ and —N(R$^{15}$)C(O)R$^{15}$, wherein each R$^{15}$ is independently selected from alkyl, aryl, arylalkyl optionally substituted one or two or more times with a substituent selected from the group consisting of -halo, —NH$_3^+$, —SO$_3$H, —SO$_3$, —CO$_2$H, —CO$_2^-$, —P(O)(OH)$_2$, —P(O)(O$^-$)$_2$.

Where a particular moiety described herein is stated to be optionally substituted, for example with a $C_{1-6}$ alkyl group, one or more such substituents may be present, on any of the parts of the moiety so substituted. For example, where reference is made to an optionally $C_{1-6}$alkyl-substituted $C_{6-10}$aryl$C_{1-24}$alkyl, either the $C_{6-10}$aryl portion or the $C_{1-24}$alkylene portion, or both, may be substituted with one or more $C_{1-6}$alkyl groups. Typically, however in such instances, the particular moiety is only substituted once.

According to particular embodiments, a=1 or 2 and k=1 or 2.

As is known, the ability of metal driers to catalyse the curing of oxidatively curable coating compositions arises from their ability to participate in redox chemistry: the nature of the counterion(s) Y are not of great importance. The choice of these may be affected by the solubility of the complex of metal ions and chelant of formula (I) or formula (II) in a given formulation or composition. For example, counterion(s) Y, such as chloride, sulfate or acetate, may serve to provide a readily water-soluble complex, if a water-based paint is desired. When using solvent-based (i.e. non-aqueous) compositions, it may be desirable to use larger, less polar counterions such as 2-ethylhexanoate. Suitable counterion(s) Y (and coordinating species X) may be selected without difficulty by the skilled person.

According to particular embodiments, X and Y may be independently selected from the group consisting of bromide, iodide, nitrate, sulfate, methoxide, ethoxide, formate, acetate, propionate, 2-ethylhexanoate, naphthenate, and hydroxide.

An example of a neutral molecule able to coordinate the metal in a mono-, bi- or tridentate manner is acetonitrile, for example, to afford a complex of the formula [ML(CH$_3$CN)]Cl$_2$.

It will be understood that counterions Y serve to balance the charge resultant from the complex formed by the metal ion(s) M, coordinating species X and chelant(s) L. Thus, if the charge on the complex is positive, there will be one or more anions Y. Conversely, there will be one or more cations Y if the charge on the complex is negative.

Particular examples of complexes comprising the chelant L of formula (I) include [MLCl$_2$], [MLCl]Cl, [ML(H$_2$O)](PF$_6$)$_2$, [ML]Cl$_2$, [MLCl]PF$_6$ and [ML(H$_2$O)](BF$_4$)$_2$. Particular examples of complexes comprising the chelant L of formula (II) include [MLCl$_2$], [MLCl]Cl, [ML(H$_2$O)](PF$_6$)$_2$, [ML]Cl$_2$, [MLCl]PF$_6$, [ML(H$_2$O)](BF$_4$)$_2$, [M$_2$LCl$_4$], [M$_2$LCl$_2$]Cl$_2$, [M$_2$L(H$_2$O)$_2$](PF$_6$)$_4$, [M$_2$L]Cl$_4$, [M$_2$LCl$_2$](PF$_6$)$_2$ and [M$_2$L(H$_2$O)$_2$](BF$_4$)$_4$. In particular embodiments, transition metal ion M in this context is an ion of iron or manganese, often of iron.

When mononuclear complexes according to formula (III) are used, these are preferably present as the following forms: [FeLCl$_2$], [FeLBr$_2$], [FeLCl]Cl, [MnLCl$_2$], [MnLBr$_2$], [MnLCl]Cl, [FeL(CH$_3$CN)]Cl$_2$, [MnL(CH$_3$CN)]Cl$_2$, [FeL(CH$_3$CN)$_2$]Cl$_2$ and [MnL(CH$_3$CN)$_2$]Cl$_2$.

It will be understood from the foregoing discussion that complexes of formula (III) embrace dinuclear complexes (i.e. comprising two metal ions M), such as those containing hydroxide, oxo, carboxylate or halide as bridging ligands (with a bridging ligand indicated with mu (p)). Depending on the denticity of the chelant L according to formula (I) or formula (II) (i.e. the number of atoms through which it chelates), one or more bridging molecules may be present. A combination of bridging and non-bridging ligands X may be present. Non-limiting examples of dinuclear iron and manganese complexes include [LFe(μ-O)(μ-RCOO)FeL](Y)$_2$, [LFe(μ-O)(μ-RCOO)FeL](Y)$_3$, [LFe(X)(μ-O)Fe(X)L]

$(Y)_3$, [LFe(μ-O)FeL](Y)$_3$, [LFe(μ-OH)$_2$FeL](Y)$_3$ [LMn(μ-RCOO)$_3$MnL](Y) and [LMn(μ-O)(μ-RCOO)$_2$MnL](Y)$_2$, wherein RCOO=acetate or 2-ethylhexanoate and L is a chelant of formula (I) or formula (II), whereby, if present, only one of the two tetradentate or pentadentate nitrogen donor moieties of the chelant (II), i.e. the moieties within the chelants of formula (II) either side of the bridge Q, bind to a Fe or Mn ion; X=H$_2$O, OH$^-$, Cl$^-$; Fe is in oxidation state II or III, and Mn is in oxidation state II or III.

In case both of the two tetradentate or pentadentate nitrogen donor moieties of a chelant of formula (II) bind to a Fe or Mn ion to form dinuclear complexes, these two metal ions may be bridged (in addition to bridging with the chelant of formula (II) that is) for example via hydroxide, oxo, carboxylate or halide groups. Thus, the following non-limiting examples of complexes of formula (III) can be obtained: [LFe(μ-O)(μ-RCOO)Fe](Y)$_2$, [LFe(μ-O)(μ-RCOO)Fe](Y)$_3$, [LFe(X)(μ-O)Fe(X)](Y)$_3$, [LFe(μ-O)Fe](Y)$_3$, [LFe(μ-OH)$_2$Fe](Y)$_3$ and [LMn(μ-O)$_2$Mn]Y$_3$ wherein RCOO=acetate or 2-ethylhexanoate and L is a chelant according to formulae (II); X=H$_2$O, OH$^-$, Cl$^-$, Fe is in oxidation state II or III, and Mn is in oxidation state III or IV.

Alternatively, the chelant according to formula (II) may bind to two Fe or Mn ions wherein the complex formed does not contain any additional bridging ligand between the two metal ions coordinated to the same chelant. For example, with chelants of formula (II) comprising two bispidon units bridged by a bridge Q, if the bispidon is pentadentate (i.e. with each E being, for example pyridin-2-yl and each R2 being pyridin-2-ylmethyl), the sixth position of the iron or manganese ions susceptible to coordination may face outwards and may bind to, for example, hydroxide, oxo, carboxylate or halide groups that are not additionally bound to another Fe or Mn ion of the same chelant of formula (II). It might be possible that such hydroxide, oxo, carboxylate or halide groups are bound to the Fe or Mn ion bound to another Fe or Mn ion coordinated to another chelant of formula (II). In this way, oligomeric complexes can be obtained. Preferred structures in case there are no bridging groups, are similar as for the mononucleating ligand, such as [L(FeCl$_2$)$_2$], [L(FeBr$_2$)$_2$], [L(FeCl$_2$)], [L(MnCl$_2$)$_2$], [L(MnBr$_2$)$_2$], [L(MnCl$_2$)], [L(Fe(CH$_3$CN))$_2$]Cl$_2$, [L(Mn(CH$_3$CN))$_2$]Cl$_2$, [L(Fe(CH$_3$CN)$_2$)$_2$]Cl$_2$, [L(Mn(CH$_3$CN)$_2$)$_2$]Cl$_2$.

A formulation of the invention can, and generally will, be used in the manufacture of a fully formulated oxidatively curable coating composition. By the term "fully formulated oxidatively curable coating composition" is implied, as is known to those of skill in the art, oxidatively curable formulations that comprise additional components over and above the binder (the oxidatively curable material, which is predominantly oxidatively curable alkyd resin according to the present invention), an aqueous or non-aqueous solvent/liquid continuous phase and any metal driers intended to accelerate the curing process. Such additional components are generally included so as to confer desirable properties upon the coating composition, such as colour or other visual characteristics such as glossiness or mattness, physical, chemical and even biological stability (enhanced biological stability being conferred upon coating compositions by the use of biocides for example), or modified texture, plasticity, adhesion or viscosity.

For example, such optional additional components may be selected from solvents, antioxidants (sometimes referred to as antiskinning agents), additional siccatives (i.e. not comprising chelants of formula (I) or (II)), auxiliary driers, colourants (including inks and coloured pigments), fillers, plasticisers, viscosity modifiers, UV light absorbers, stabilisers, antistatic agents, flame retardants, lubricants, emulsifiers (in particular where an oxidatively curable coating composition or formulation of the invention is aqueous-based), anti-foaming agents, viscosity modifiers, antifouling agents, biocides (e.g. bactericides, fungicides, algaecides and insecticides), anticorrosion agents, antireflective agents, anti-freezing agents, waxes and thickeners. Typically, formulations prepared in accordance with embodiments of the method of the second aspect of the invention will comprise at least an organic solvent, selected from the list of solvents described above and a filler, and generally an antiskinning agent, in addition to the alkyd and optionally other binders and chelant present in the formulation of the invention. The skilled person is familiar with the incorporation of these and other components into oxidatively curable coating composition so as to optimise such compositions' properties.

It will be appreciated that some of these optional additional components possess more than one functional property. For example, some fillers may also function as colourants. The nature of any additional components and the amounts used may be determined in accordance with the knowledge of those of skill in the art and will depend on the application for which the curable coating compositions intended. Examples are provided below but these are intended to be illustrative, not limitative.

When producing a fully formulated oxidatively curable coating composition that is, for example, a paint, one or more antioxidants (customarily referred to in the art as antiskinning agents) are often included to avoid premature curing of the oxidatively curable coating composition prior to its use. Such premature curing may be manifested by, for example, the formation of a skin on or lumpy matter in the oxidatively curable coating composition as a result of curing during storage, for example hardening of the surface of a paint layer in a can), owing to the activity of the siccative with oxygen on the oxidatively curable binder. Antiskinning agents are understood to reduce skinning by quenching radicals formed and/or by inactivation of drier catalysts by binding to one or more of the coordination sites. Examples include, but are not limited to, methylethylketoxime, 2-pentanone-oxime, acetonoxime, butyraldoxime, methylisobutylketoxime, 2-cyclohexylphenol, 4-cyclohexylphenol, t-butyl-hydroquinone, dialkylhydroxylamine, acetylacetonate, ammonia, vitamin E (tocopherol), hydroxylamine, triethylamine, dimethylethanolamine, 2-t-butyl-4-methylphenol, and 2-[(1-methylpropyl)amino]ethanol. According to particular embodiments, the antiskinning agent is selected from the group consisting of methylethylketone-oxime, 2-pentanone-oxime, acetonoxime, butyraldoxime, dialkylhydroxylamine, ammonia, hydroxylamine, triethylamine, dimethylethanolamine, o-cyclohexylphenol, p-cyclohexylphenol and 2-t-butyl-4-methylphenol.

The quantity of antiskinning agent present in an oxidatively curable coating composition is typically between about 0.001% by weight and about 2.5% by weight. The antioxidant or antiskinning agent may be added to an alkyd-based resin formulation, e.g. of the invention, together with (or separately from) the chelant prior to or during the preparation of a fully formulated oxidatively curable coating composition (for example a paint or other coating composition).

Colourants include pigments and inks. Titanium dioxide is a pigment commonly included in many coating compositions, in particular paints.

Fillers may be added to an oxidatively curable coating composition for a number of reasons, for example to bulk out the coating composition and to compare particular properties on the cured composition. Typically, fillers will be inorganic solids that are generally introduced in particulate (finely divided) form. Examples include silica, silicates or clays (for example mica, talc, kaolin), carbonate or other minerals and metal salts or oxides (such as marble, quartzite). Other suitable fillers will be evident to the skilled person.

It may be advantageous if an alkyd resin manufacturer has determined a particular concentration of metal drier that is appropriate for a particular alkyd-based resin formulation for the manufacturer to recommend to users of the formulation an appropriate source of transition metal ions that may be added in order to generate a desired metal drier in situ.

Moreover, according to the fifth aspect of the invention, there is provided a kit comprising a formulation of the invention comprising less than 0.00005% by weight of ions of each of at least iron, manganese, cobalt, vanadium and copper and, separately, a composition comprising a source of suitable transition metal ions, typically ions selected from the group consisting of iron, manganese, vanadium and copper ions, more typically either iron ions or manganese ions and often iron ions, particularly often in the form of a salt such as those described above, for admixture to a formulation of the invention. The kit may optionally comprise instructions or other guidance as to methods according to which the formulation and the transition metal ions may be contacted. In this way, the manufacture of a formulation of the invention can, after optimising the nature of the source of transition metal ions, for example by the preparation of a particular solution of a particular transition metal ions salt, optimise the manner in which formulations containing transition metal complexes can be prepared. The preparation of an oxidatively curable alkyd-based coating composition may be by the manufacturer of such compositions (e.g. a paint manufacturer) or by an end consumer of oxidatively curable alkyd-based coating compositions, who can contact a source of transition metal ions with an otherwise fully formulated oxidatively curable alkyd-based coating composition.

It is also within the scope of the current invention that a paint manufacturer, for example, would add commercial metal-soap/chelant mixtures, such as the non-limiting example of Borchers® Dry 0410 (a mixture of bpy with Mn(neodecanoate)$_2$ commercially available from OMG), as a mixture of bpy with Mn(neodecanoate)$_2$. The additional chelant present in the alkyd resin will improve the drying behaviour without causing excessive yellowing which may be occurring if more of the Mn-soap/ligand mixture is added to the paint formulation.

Additionally, one or more auxiliary driers may be added to the fully formulated oxidatively curable coating composition. Such auxiliary driers may be optional additional components within, but are often not present in, the formulation of the invention. Such auxiliary driers include fatty acid soaps of zirconium, bismuth, barium, cerium, calcium, lithium, strontium, and zinc. Typically, fatty acid soaps are optionally substituted octanoates, hexanoates and naphthanates. Without being bound by theory, auxiliary driers (sometimes referred to as through driers) are generally understood to diminish the effect of adsorption of the main drier on solid particles often present in an oxidatively curable coating composition. Other non-metal based auxiliary driers may also be present if desired. These may include, for example, thiol compounds, as described in US 2001/0008932 A1 (Bakkeren et al.) or biomolecules as described in US 2005/0245639 A1 (Oostveen et al.). Concentrations of auxiliary driers within oxidatively curable coating compositions (or formulations of the invention) are typically between about 0.01% by weight and 2.5% by weight as is known in the art.

The formulations of the invention (including the fully formulated oxidatively curable coating compositions described herein) may be used as a decorative coating, e.g. applied to wood substrates, such as door or window frames, or for other substrates such as those made of synthetic materials (such as plastics including elastomeric materials), concrete, leather, textile, glass, ceramic or metal, in accordance with the sixth aspect of the invention. The thus-applied composition may then be allowed to cure. In this respect, the third aspect of the invention is directed towards a formulation according to the first aspect, or obtainable according to the second aspect, when cured.

Each and every patent and non-patent reference referred to herein is hereby incorporated by reference in its entirety, as if the entire contents of each reference were set forth herein in its entirety.

The invention may be further understood with reference to the following non-limiting clauses:

1. A formulation comprising an oxidatively curable alkyd-based resin and a chelant of formula (I) or formula (II):

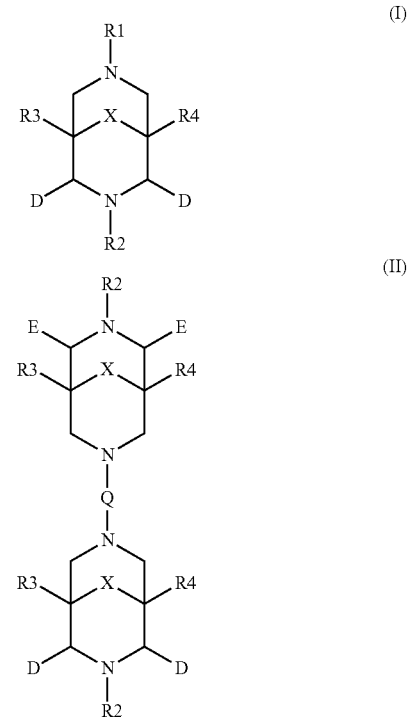

wherein:
  each D is independently selected from the group consisting of thiazol-2-yl, thiazol-4-yl, pyrazin-2-yl, quinolin-2-yl, pyrazol-3-yl, pyrazol-1-yl, pyrrol-2-yl, imidazol-2-yl, imidazol-4-yl, benzimidazol-2-yl, pyrimidin-2-yl, 1,2,4-triazol-3-yl, 1,2,4-triazol-1-yl, 1,2,3-triazol-1-yl, 1,2,3-triazol-2-yl and 1,2,3-triazol-4-yl, each of which may be optionally substituted by one or more groups independently selected from the group consisting of —F, —Cl, —Br, —OH, —OC$_1$-C$_4$alkyl, —NH—

CO—H, —NH—CO—C$_1$-C$_4$alkyl, —NH$_2$, —NH—C$_1$-C$_4$alkyl, and —C$_1$-C$_4$alkyl;

each E is independently selected from the group consisting of pyridin-2-yl, thiazol-2-yl, thiazol-4-yl, pyrazin-2-yl, quinolin-2-yl, pyrazol-3-yl, pyrazol-1-yl, pyrrol-2-yl, imidazol-2-yl, imidazol-4-yl, benzimidazol-2-yl, pyrimidin-2-yl, 1,2,4-triazol-3-yl, 1,2,4-triazol-1-yl, 1,2,3-triazol-1-yl, 1,2,3-triazol-2-yl and 1,2,3-triazol-4-yl, each of which may be optionally substituted by one or more groups independently selected from the group consisting of —F, —Cl, —Br, —OH, —OC$_1$-C$_4$alkyl, —NH—CO—H, —NH—CO—C$_1$-C$_4$alkyl, —NH$_2$, —NH—C$_1$-C$_4$alkyl, and —C$_1$-C$_4$alkyl;

R1 and the or each R2 are independently selected from the group consisting of C$_1$-C$_{24}$alkyl, C$_{6-10}$arylC$_1$-C$_6$alkyl, C$_{6-10}$aryl, C$_5$-C$_{10}$heteroarylC$_1$-C$_6$alkyl, each of which may be optionally substituted by one or more groups selected from —F, —Cl, —Br, —OH, —OC$_1$-C$_4$alkyl, —NH—CO—H, —NH—CO—C$_1$-C$_4$alkyl, —NH$_2$, —NH—C$_1$-C$_4$alkyl and —SC$_1$-C$_4$alkyl; and CH$_2$CH$_2$N(R8)(R9), wherein N(R8)(R9) is selected from the group consisting of di(C$_{1-44}$alkyl)amino; di(C$_{6-10}$aryl)amino in which each of the aryl groups is independently optionally substituted with one or more C$_{1-20}$alkyl groups; di(C$_{6-10}$arylC$_{1-6}$alkyl)amino in which each of the aryl groups is independently optionally substituted with one or more C$_{1-20}$alkyl groups; NR7, in which R7 and the nitrogen atom N to which it is attached represent a heterocycloalkyl group optionally substituted with one or more C$_{1-20}$alkyl groups, which is connected to the remainder of R1 or R2 through the nitrogen atom N; di(heterocycloalkylC$_{1-6}$alkyl)amino, in which each of the heterocycloalkyl groups is independently optionally substituted with one or more C$_{1-20}$alkyl groups; and di(heteroarylC$_{1-6}$alkyl)amino, wherein each of the heteroaryl groups is independently optionally substituted with one or more C$_{1-20}$alkyl groups;

R3 and R4 are independently selected from hydrogen, C$_1$-C$_8$alkyl, C$_1$-C$_8$alkyl-O—C$_1$-C$_8$alkyl, C$_6$-C$_{10}$ aryloxyC$_1$-C$_8$alkyl, C$_6$-C$_{10}$aryl, C$_1$-C$_8$hydroxyalkyl, C$_6$-C$_{10}$arylC$_1$-C$_6$alkyl and C$_5$-C$_{10}$heteroarylC$_1$-C$_6$alkyl, and —(CH$_2$)$_{0-4}$C(O)OR5 wherein R5 is independently selected from: hydrogen, C$_1$-C$_8$alkyl and C$_{6-10}$aryl;

Q represents a bridge selected from the group consisting of a C$_{1-6}$alkylene moiety, a C$_{6-10}$arylene moiety or a moiety comprising one or two C$_{1-3}$alkylene units and one C$_{6-10}$arylene unit, which bridge is optionally substituted one or more times with independently selected C$_{1-24}$alkyl groups and OH groups; and X is selected from C=O, —[C(R6)$_2$]$_{0-3}$— wherein each R6 is independently selected from hydrogen, hydroxyl, C$_1$-C$_4$alkoxy and C$_1$-C$_4$alkyl.

2. The formulation of clause 1, wherein R3 and R4 are of the formula —C(O)OR5 wherein each R5 is independently selected from hydrogen, C$_1$-C$_8$alkyl and C$_{6-10}$aryl.

3. The formulation of clause 2, wherein R3 and R4 are of the formula —C(O)OR5 wherein each R5 is independently C$_1$-C$_4$alkyl.

4. The formulation of any one of clauses 1 to 3, wherein R3=R4.

5. The formulation of clause 4, wherein the R3 and R4 groups are —C(O)OCH$_3$.

6. The formulation of any one of clauses 1 to 5, wherein X is selected from C=O and —[C(R6)$_2$]-, wherein each R6 is independently selected from hydrogen, hydroxyl and C$_1$-C$_4$alkoxy.

7. The formulation of clause 6, wherein X is selected from C=O, C(OH)$_2$ and C(OCH$_3$)$_2$.

8. The formulation of clause 7, wherein X is either C=O or C(OH)$_2$.

9. The formulation of any one of clause 1 to 8, wherein the chelant is formula (I).

10. The formulation of clause 9, wherein each D is unsubstituted.

11. The formulation of clause 9 or clause 10, wherein each D is the same.

12. The formulation of clause 11, wherein each D is either thiazol-2-yl or thiazol-4-yl.

13. The formulation of any one of clauses 9 to 12, wherein each of R1 and R2 is independently selected from C$_1$-C$_{24}$alkyl, C$_6$-C$_{10}$aryl, C$_{6-10}$arylC$_1$-C$_6$alkyl, C$_5$-C$_{10}$heteroarylCH$_2$ and CH$_2$CH$_2$N(R8)(R9), wherein —N(R8)(R9) is selected from —NMe$_2$, —NEt$_2$, —N(i-Pr)$_2$,

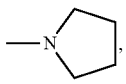

14. The formulation of clause 13, wherein one of R1 and R2 is C$_1$-C$_{24}$alkyl or C$_{6-10}$arylC$_1$-C$_6$alkyl and the other of R1 and R2 is a C$_5$-C$_{10}$heteroarylCH$_2$ group or CH$_2$CH$_2$N(R8)(R9), wherein —N(R8)(R9) is selected from —NMe$_2$, —NEt$_2$, —N(i-Pr)$_2$,

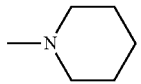

15. The formulation of clause 13 or clause 14, wherein at least one of R1 and R2 is independently selected from C$_1$-C$_{18}$alkyl and C$_{6-10}$arylC$_1$-C$_6$alkyl.

16. The formulation of clause 15, wherein at least one of R1 and R2 is C$_1$-C$_{18}$alkyl.

17. The formulation of clause 16, wherein at least one of R1 and R2 is C$_1$-C$_{12}$alkyl.

18. The formulation of clause 15, wherein at least one of R1 and R2 is independently selected from C$_1$-C$_8$alkyl and C$_6$-C$_{10}$arylCH$_2$.

19. The formulation of any one of clauses 13 to 18, wherein at least one of R1 and R2 is methyl.

20. The formulation of any one of clause 13 to 19, wherein at least one of R1 and R2 is independently selected from pyridin-2-ylmethyl, pyrazin-2-ylmethyl, quinolin-2-ylmethyl, pyrazol-1-ylmethyl, pyrazol-3-ylmethyl, pyrrol-2-ylmethyl, imidazol-2-ylmethyl, imidazol-4-ylmethyl, benzimidazol-2-ylmethyl, pyrimidin-2-ylmethyl, 1,2,3-triazol-1-ylmethyl, 1,2,3-triazol-2-ylmethyl, 1,2,3-triazol-4-ylmethyl, 1,2,4-triazol-3-ylmethyl, 1,2,4-triazol-1-ylmethyl, thiazol-2-ylmethyl and thiazol-4-ylmethyl.

21. The formulation of any one of clauses 13 to 19, wherein at least one of R1 and R2 is independently selected from pyridin-2-ylmethyl, quinolin-2-ylmethyl, imidazol-2-ylmethyl, thiazol-2-ylmethyl and thiazol-4-ylmethyl.

22. The formulation of any of clauses 13 to 19, wherein one or each of R1 and R2 is an optionally substituted pyridin- 2-ylmethyl or CH$_2$CH$_2$N(R8)(R9), wherein —N(R8)(R9) is selected from —NMe$_2$, —NEt$_2$, —N(i-Pr)$_2$,

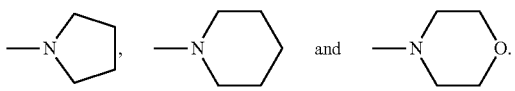

23. The formulation of clause 22, wherein one or each of R1 and R2 is pyridin-2-ylmethyl.
24. The formulation of any one of clauses 1 to 8, wherein the chelant is formula (II).
25. The formulation of clause 24, wherein each E is unsubstituted.
26. The formulation of clause 24 or clause 25, wherein each E is the same.
27. The formulation of clause 26, wherein each E is pyridin-2-yl, thiazol-2-yl, or thiazol-4-yl.
28. The formulation of clause 27, wherein each E is pyridin-2-yl.
29. The formulation of any one of clauses 24 to 28, wherein -Q- is selected from —CH$_2$CH$_2$—, —CH$_2$CH$_2$CH$_2$— and —CH$_2$CHOHCH$_2$—, each of which is optionally C$_1$-C$_6$alkyl-substituted.
30. The formulation of clause 29, wherein -Q- is selected from unsubstituted —CH$_2$CH$_2$—, —CH$_2$CH$_2$CH$_2$— and —CH$_2$CHOHCH$_2$—.
31. The formulation of any one of clauses 24 to 30, wherein R2 is selected from C$_5$-C$_{10}$heteroarylCH$_2$ and CH$_2$CH$_2$N(R8)(R9), whereby —N(R8)(R9) is selected from —NMe$_2$, —NEt$_2$, —N(i-Pr)$_2$,

32. The formulation of clause 31, wherein R2 is selected from pyridin-2-ylmethyl, pyrazin-2-ylmethyl, quinolin-2-ylmethyl, pyrazol-1-ylmethyl, pyrazol-3-ylmethyl, pyrrol-2-ylmethyl, imidazol-2-ylmethyl, imidazol-4-ylmethyl, benzimidazol-2-ylmethyl, pyrimidin-2-ylmethyl, 1,2,3-triazol-1-ylmethyl, 1,2,3-triazol-2-ylmethyl, 1,2,3-triazol-4-ylmethyl, 1,2,4-triazol-3-ylmethyl, 1,2,4-triazol-1-ylmethyl, thiazol-2-ylmethyl, and thiazol-4-ylmethyl.
33. The formulation of clause 31, wherein R2 is selected from pyridin-2-ylmethyl, quinolin-2-ylmethyl, imidazol-2-ylmethyl, thiazol-2-ylmethyl, and CH$_2$CH$_2$N(R8)(R9).
34. The formulation of clause 31, wherein R2 is selected from an optionally substituted pyridin-2-ylmethyl and CH$_2$CH$_2$N(R8)(R9).
35. The formulation of clause 34, wherein R2 is pyridin-2-ylmethyl.
36. The formulation of clause 1, wherein the chelant is selected from the group consisting of dimethyl 2,4-di(thiazol-2-yl)-3-methyl-7-(pyridin-2-ylmethyl)-3,7-diaza-bicyclo[3.3.1]nonan-9-one-1,5-dicarboxylate, dimethyl 2,4-di(thiazol-2-yl)-3-(pyridin-2-ylmethyl)-7-methyl-3,7-diaza-bicyclo[3.3.1]nonan-9-one-1,5-dicarboxylate, dimethyl 2,4-di(thiazol-4-yl)-3-methyl-7-(pyridin-2-ylmethyl)-3,7-diaza-bicyclo[3.3.1]nonan-9-one-1,5-dicarboxylate, dimethyl 2,4-di(thiazol-4-yl)-3-(pyridin-2-ylmethyl)-7-methyl-3,7-diaza-bicyclo[3.3.1]nonan-9-one-1,5-dicarboxylate, dimethyl 2,4-di(thiazol-2-yl)-3,7-dimethyl-3,7-diaza-bicyclo[3.3.1]nonan-9-one-1,5-dicarboxylate, dimethyl 2,4-di(thiazol-4-yl)-3,7-dimethyl-3,7-diaza-bicyclo[3.3.1]nonan-9-one-1,5-dicarboxylate, 1,2-di{1,5-di(methoxycarbonyl)-3-(pyridin-2-ylmethyl)-9-oxo-2,4-di(pyridin-2-yl)-3,7-diazabicyclo[3.3.1]nonan-7-yl}ethane, 1,3-di{1,5-di(methoxycarbonyl)-3-(pyridin-2-ylmethyl)-9-oxo-2,4-di(pyridin-2-yl)-3,7-diazabicyclo[3.3.1]nonan-7-yl}propane, 1,2-di{1,5-di(methoxycarbonyl)-3-methyl-9-oxo-2,4-di(pyridin-2-yl)-3,7-diazabicyclo[3.3.1]nonan-7-yl}ethane and 1,3-di{1,5-di(methoxycarbonyl)-3-methyl-9-oxo-2,4-di(pyridin-2-yl)-3,7-diazabicyclo[3.3.1]nonan-7-yl}propane.
37. The formulation of clause 36, wherein the chelant is selected from the group consisting of dimethyl 2,4-di(thiazol-2-yl)-3-methyl-7-(pyridin-2-ylmethyl)-3,7-diaza-bicyclo[3.3.1]nonan-9-one-1,5-dicarboxylate, dimethyl 2,4-di(thiazol-2-yl)-3-(pyridin-2-ylmethyl)-7-methyl-3,7-diazabicyclo[3.3.1]nonan-9-one-1,5-dicarboxylate, dimethyl 2,4-di(thiazol-4-yl)-3-methyl-7-(pyridin-2-ylmethyl)-3,7-diazabicyclo[3.3.1]nonan-9-one-1,5-dicarboxylate, dimethyl 2,4-di(thiazol-4-yl)-3-(pyridin-2-ylmethyl)-7-methyl-3,7-diazabicyclo[3.3.1]nonan-9-one-1,5-dicarboxylate, 1,2-di{1,5-di(methoxycarbonyl)-3-(pyridin-2-ylmethyl)-9-oxo-2,4-di(pyridin-2-yl)-3,7-diazabicyclo[3.3.1]nonan-7-yl}ethane and 1,3-di{1,5-di(methoxycarbonyl)-3-(pyridin-2-ylmethyl)-9-oxo-2,4-di(pyridin-2-yl)-3,7-diazabicyclo[3.3.1]nonan-7-yl}propane.
38. The formulation of any one of clauses 1 to 37, wherein the chelant is present in the formulation at a concentration of between about 0.00001 and about 0.5 wt % with respect to curable resin.
39. The formulation of clause 38, wherein the chelant is present in the formulation at a concentration of between about 0.00005 and about 0.1 wt % with respect to curable resin.
40. The formulation of any one of clauses 1 to 39, further comprising an antiskinning agent.
41. The formulation of clause 40, wherein the antiskinning agent is selected from the group consisting of methylethylketone-oxime, 2-pentanone-oxime, acetonoxime, butyraldoxime, dialkylhydroxylamine, ammonia, hydroxylamine, triethylamine, dimethylethanolamine, o-cyclohexylphenol, p-cyclohexylphenol and 2-t-butyl-4-methylphenol.
42. The formulation of any one of clauses 1 to 41, which comprises a complex comprising the chelant of formula (I) or formula (II) and a transition metal ion selected from the group consisting of ions of iron, manganese, vanadium or copper.
43. The formulation of clause 42, wherein the complex comprises an iron or a manganese ion.
44. The formulation of clause 43, wherein the complex comprises an iron ion.
45. The formulation of any one of clauses 1 to 41, which formulation comprises less than 0.00005% by weight of ions of each of iron, manganese, cobalt, vanadium and copper.
46. A method of preparing a formulation as defined in any one of clauses 1 to 45, the method comprising contacting a composition comprising an alkyd-based resin with a composition comprising the chelant.
47. The method of clause 46 wherein the formulation is as defined in clause 45.
48. The method of clause 47 further comprising contacting the formulation with a source of transition metal ions.
49. The method of clause 48, wherein the transition metal ions are iron, manganese, vanadium or copper ions.
50. The method of clause 48 or clause 49 wherein a solution of transition metal ions is contacted with the formulation.
51. The method of any one of clauses 48 to 50, wherein the formulation is contacted with an optionally hydrated salt selected from the group consisting of MnCl$_2$, FeCl$_2$, FeCl$_3$, MnBr$_2$, Mn(NO$_3$)$_2$, Fe(NO$_3$)$_3$, MnSO$_4$, FeSO$_4$, (Fe)$_2$(SO$_4$)$_3$, Mn(acetylacetonate)$_2$, Fe(acetylacetonate)$_2$, Mn(acetylacetonate)$_3$, Fe(acetylacetonate)$_3$, Mn(R$_5$COO)$_3$, Fe(R$_5$COO)$_3$, Mn(R$_5$COO)$_2$ and Fe(R$_5$COO)$_2$, wherein each R$_5$ is independently a C$_1$-C$_{24}$ alkyl.

52. The method of any one of clauses 48 to 51, wherein the transition metal ions are iron ions.

53. The method of clause 52, wherein the formulation is contacted with an optionally hydrated salt selected from the group consisting of FeCl$_2$, FeCl$_3$, FeSO$_4$, Fe(acetylacetonate)$_3$, Fe(NO$_3$)$_3$, Fe(2-ethylhexanoate)$_2$, Fe(neodecanoate)$_2$, Fe(2-ethylhexanoate)$_3$, Fe(naphthenate)$_2$ and Fe(neodecanoate)$_3$.

54. The method of clause 46, wherein the composition comprising the chelant comprises a complex as defined in any clause 42 or clause 43.

55. The method of clause 54, wherein the composition comprising the chelant comprises a complex as defined in clause 44.

56. The method of clause 54 or clause 55, wherein the composition comprising the complex comprises a mixture of the chelant and a salt of a transition metal ion.

57. The method of clause 56, wherein the salt is as defined in any one of clauses 51 to 53.

58. A composition resultant from curing a formulation as defined in any one of clauses 42 to 44.

59. A chelant of formula (I) or (II) as defined in clause 1, which is dimethyl 2,4-di(thiazol-2-yl)-3-methyl-7-(pyridin-2-ylmethyl)-3,7-diaza-bicyclo[3.3.1]nonan-9-one-1,5-dicarboxylate, dimethyl 2,4-di(thiazol-2-yl)-3-(pyridin-2-ylmethyl)-7-methyl-3,7-diaza-bicyclo[3.3.1]nonan-9-one-1,5-dicarboxylate, dimethyl 2,4-di(thiazol-4-yl)-3-methyl-7-(pyridin-2-ylmethyl)-3,7-diaza-bicyclo[3.3.1]nonan-9-one-1,5-dicarboxylate, dimethyl 2,4-di(thiazol-4-yl)-3-(pyridin-2-ylmethyl)-7-methyl-3,7-diaza-bicyclo[3.3.1]nonan-9-one-1,5-dicarboxylate, dimethyl 2,4-di(thiazol-2-yl)-3,7-dimethyl-3,7-diaza-bicyclo[3.3.1]nonan-9-one-1,5-dicarboxylate, dimethyl 2,4-di(thiazol-4-yl)-3,7-dimethyl-3,7-diaza-bicyclo[3.3.1]nonan-9-one-1,5-dicarboxylate, 1,2-di{1,5-di(methoxycarbonyl)-3-(pyridin-2-ylmethyl)-9-oxo-2,4-di(pyridin-2-yl)-3,7-diazabicyclo[3.3.1]nonan-7-yl}ethane or 1,3-di{1,5-di(methoxycarbonyl)-3-(pyridin-2-ylmethyl)-9-oxo-2,4-di(pyridin-2-yl)-3,7-diazabicyclo[3.3.1]nonan-7-yl}propane, or a transition metal ion complex thereof.

60. The chelant of clause 59, which is dimethyl 2,4-di(thiazol-2-yl)-3-methyl-7-(pyridin-2-ylmethyl)-3,7-diazabicyclo[3.3.1]nonan-9-one-1,5-dicarboxylate, dimethyl 2,4-di(thiazol-2-yl)-3-(pyridin-2-ylmethyl)-7-methyl-3,7-diazabicyclo[3.3.1]nonan-9-one-1,5-dicarboxylate, dimethyl 2,4-di(thiazol-4-yl)-3-methyl-7-(pyridin-2-ylmethyl)-3,7-diazabicyclo[3.3.1]nonan-9-one-1,5-dicarboxylate, dimethyl 2,4-di(thiazol-4-yl)-3-(pyridin-2-ylmethyl)-7-methyl-3,7-diazabicyclo[3.3.1]nonan-9-one-1,5-dicarboxylate, 1,2-di{1,5-di(methoxycarbonyl)-3-(pyridin-2-ylmethyl)-9-oxo-2,4-di(pyridin-2-yl)-3,7-diazabicyclo[3.3.1]nonan-7-yl}ethane and 1,3-di{1,5-di(methoxycarbonyl)-3-(pyridin-2-ylmethyl)-9-oxo-2,4-di(pyridin-2-yl)-3,7-diazabicyclo[3.3.1]nonan-7-yl}propane, or a transition metal ion complex thereof.

61. A kit comprising a formulation as defined in clause 45 and, separately, a composition comprising transition metal ions selected from the group consisting of iron, manganese, vanadium and copper ions.

62. The kit of clause 61, wherein the transition metal ions are iron ions or manganese ions.

63. The kit of clause 62, wherein the ions are provided as a salt as defined in any one of clauses 51 to 53.

64. A method comprising applying to a substrate a formulation as defined in any one of clauses 42 to 44.

The non-limiting examples below more fully illustrate the embodiments of this invention.

EXPERIMENTAL

Synthesis of [(2-TBP)Fe$^{II}$Cl](Cl)·MeOH·1.5H$_2$O (2-TBP=dimethyl 3-methyl-9-oxo-2,4-di(thiazol-2-yl)-7-(pyridin-2-ylmethyl)-3,7-diazabicyclo[3.3.1]nonane-1,5-dicarboxylate) and [(4-TBP)Fe$^{II}$Cl](Cl)·MeOH·1.5H$_2$O (4-TBP=dimethyl 3-methyl-9-oxo-2,4-di(thiazol-4-yl)-7-(pyridin-2-ylmethyl)-3,7-diazabicyclo[3.3.1]nonane-1,5-dicarboxylate) were done as described below. First the synthesis of the 2 ligands is described and then that of the iron complexes. The ligand synthesis has been done in two steps, outlined below. Then the iron complex was prepared in a one step procedure.

2,6-Di(thiazol-2-yl)-3,5-dimethyl-N-methyl-4-piperidon-3,5-dicarboxylate

2-Thiazolecarboxaldehyde (12.0 g, 106 mmol) was dissolved in MeOH (32 ml) and the solution was cooled with a waterbath at room temperature. Methylamine (40% w/w in H$_2$O) (4.59 ml, 53.0 mmol) was added drop-wise, followed by drop-wise addition of dimethyl-1,3-acetonedicarboxylate (7.65 ml, 53.0 mmol). The reaction mixture was stirred at 65° C. for 90 minutes and was subsequently stored in a freezer for 7 days. The resulting suspension was filtered with suction over a glass filter P4 and the solid was rinsed with cold EtOH (abs.) (3×10 ml). The last traces of volatiles were evaporated in vacuo yielding a white solid (9.00 g, 22.8 mmol, 43%). $^1$H NMR (400 MHz, CDCl$_3$) δ keto: 2.05 (s, 3H), 3.74 (s, 6H), 4.31 (d, J=11.0 Hz, 2H), 5.11 (d, J=10.9 Hz, 2H), 7.41-7.42 (m, 2H), 7.68-7.70 (m, 2H); enol: 2.37 (s, 3H), 3.74 (s, 3H), 3.77 (s, 3H), 4.08 (d, J=9.0 Hz, 1H), 4.84 (d, J=9.0 Hz, 1H), 4.99 (s, 1H), 7.33-7.35 (m, 2H), 7.68-7.70 (m, 1H), 7.71-7.72 (m, 1H), 12.48 (s, 1H). $^{13}$C NMR (100.6 MHz, CDCl$_3$) δ keto: 32.28, 52.45, 55.80, 64.55, 121.20, 141.82, 167.80, 167.86, 197.94; enol: 36.89, 45.23, 51.98, 52.78, 58.83, 60.75, 98.29, 120.05, 120.41, 141.86, 142.38, 166.03, 168.15, 169.59, 171.46, 172.51. ESI-MS m/z 396.3 [M+H]$^+$. HRMS (APCI) (calc. for C$_{18}$H$_{18}$N$_3$O$_5$S$_2$: 396.068) found: 396.068 [M+H]$^+$.

Dimethyl 3-methyl-9-oxo-2,4-di(thiazol-2-yl)-7-(pyridin-2-ylmethyl)-3,7-diazabicyclo[3.3.1]nonane-1,5-dicarboxylate (2-TBP)

2-Picolylamine (2.44 ml, 23.7 mmol) was dissolved in iso-butanol (125 ml) and the solution was cooled with a waterbath at room temperature. Formaldehyde (37%) (3.52 ml, 47.3 mmol) was added dropwise, followed by the slow addition of 2,6-di(thiazol-2-yl)-3,5-dimethyl-N-methyl-4-piperidon-3,5-dicarboxylate (8.50 g, 21.5 mmol). The reaction mixture was stirred at reflux for 90 minutes and was subsequently allowed to cool to room temperature. The suspension was filtered with suction over a glass-filter P4 and the solid was rinsed with iso-butanol (3×10 ml). The last traces of volatiles were evaporated in vacuo yielding a white solid (6.80 g, 12.9 mmol, 60%). $^1$H NMR (400 MHz, CDCl$_3$) δ 2.41 (s, 3H), 2.84 (d, J=12.5 Hz, 2H), 3.03 (d, J=12.9 Hz, 2H), 3.71 (s, 2H), 3.84 (s, 6H), 5.19 (s, 2H), 7.16-7.19 (m, 1H), 7.31-7.33 (m, 3H), 7.62-7.66 (m, 1H), 7.71-7.74 (m, 2H), 8.47-8.48 (m, 1H). $^{13}$C NMR (100.6 MHz, CDCl$_3$) δ 45.40, 52.83, 57.54, 62.64, 62.80, 70.05, 120.40, 122.31, 124.66, 136.09, 142.77, 149.05, 155.67, 167.63, 170.83, 201.90. ESI-MS m/z 528.3 [M+H]$^+$ and a minor peak at m/z 451.2. HRMS (APCl) (calc. for C$_{24}$H$_{26}$N$_5$O$_5$S$_2$: 528.137) found: 528.138 [M+H]$^+$.

2,6-Di(thiazol-4-yl)-3,5-dimethyl-N-methyl-4-piperidon-3,5-dicarboxylate

Dimethyl acetonedicarboxylate (1.67 ml, 0.0111 mol) and methylamine (40 wt % aq.) (0.96 ml, 0.0111 mol) were added dropwise to an ice-cold solution of thiazole-4-carbaldehyde (2.52 g, 0.0222 mol) in MeOH (25 ml). After stirring at this temperature for 2.5 h, followed by at room temperature for additional 1.5 h, the turbid orange solution was stored in the freezer (−20° C.) for overnight. The product was collected, washed with cold EtOH (5 ml), and the last traces of volatiles were evaporated in vacuo. Two more crops were obtained from evaporation and recrystallization of filtrates. The total yield of product in keto-form (off-white powder) and enol-form (white crystal) was 1.87 g (4.72 mmol, 43%). Keto-form: $^1$H NMR (400 MHz, CDCl$_3$) δ 8.84 (d, J=1.8 Hz, 2H), 7.21 (s, 2H), 4.78 (d, J=6.0 Hz, 2H), 4.13 (d, J=6.0 Hz, 2H), 3.76 (s, 6H), 2.06 (s, 3H). $^{13}$C NMR (101 MHz, CDCl$_3$) δ 207.07, 168.59, 153.49, 117.69, 61.60, 60.26, 52.86, 40.35, 31.08. Enol-form: $^1$H NMR (400 MHz, CDCl$_3$) δ 8.82 (d, J=1.9 Hz, 1H), 8.77 (d, J=2.0 Hz, 1H), 7.38 (s, 1H), 7.16 (s, 1H), 5.11 (s, 1H), 4.52 (d, J=9.7 Hz, 1H), 4.18 (d, J=9.7 Hz, 1H), 3.69 (s, 3H), 3.66 (s, 3H), 2.19 (s, 3H), 1.57 (s, 1H). $^{13}$C NMR (101 MHz, CDCl$_3$) δ 171.59, 171.07, 166.62, 157.04, 154.91, 153.13, 152.50, 117.25, 102.50, 100.02, 59.12, 57.03, 52.78, 52.10, 48.49, 38.28.

Dimethyl 3-methyl-9-oxo-2,4-di(thiazol-4-yl)-7-(pyridin-2-ylmethyl)-3,7-diazabicyclo[3.3.1]nonane-1,5-dicarboxylate (4-TBP)

Formaldehyde (37 wt %, aq.) (1.97 ml, 0.0264 mol) and 2-picolylamine (1.36 ml, 0.0132 mol) were added to a suspension of pLG (both keto- and enol-forms) (5.21 g, 0.0132 mol) in ethanol (100 ml). Heat was applied to the reaction mixture at reflux temperature, the solid slowly dissolved giving the clear, colourless solution upon heating. After a few minutes the reaction mixture turned turbid again and a white precipitate was observed. After 5 h, the reaction mixture was allowed to cool to room temperature. The suspension was filtered with suction on a glass-filter P4 and was subsequently washed with cold EtOH (15 ml). The last traces of volatiles were evaporated in vacuo yielding a off-white powder (3.45 g, 6.54 mmol, 50%). $^1$H NMR (400 MHz, CDCl$_3$) δ 8.66 (d, J=2.1 Hz, 2H), 8.62 (d, J=4.1 Hz, 1H), 7.63 (td, J=7.7, 1.7 Hz, 1H), 7.57 (d, J=2.0 Hz, 2H), 7.35 (d, J=7.7 Hz, 1H), 7.24-7.19 (m, 1H), 4.79 (s, 2H), 3.75 (s, 6H), 3.63 (s, 2H), 3.40 (d, J=12.0 Hz, 2H), 3.00 (d, J=11.8 Hz, 2H), 2.01 (s, 3H). $^{13}$C NMR (101 MHz, CDCl$_3$) δ 202.87, 168.68, 157.74, 154.77, 152.47, 149.46, 136.50, 124.17, 122.57, 118.52, 69.75, 63.31, 62.81, 58.22, 52.65, 42.78.

[(2-TBP)Fe$^{II}$Cl](Cl)·MeOH·1.5H$_2$O (2-TBP=dimethyl 3-methyl-9-oxo-2,4-di(thiazol-2-yl)-7-(pyridin-2-ylmethyl)-3,7-diazabicyclo[3.3.1]nonane-1,5-dicarboxylate)

MeOH (20 ml) was purged with argon for 20 minutes. Iron(II)chloride tetrahydrate (279 mg, 1.40 mmol) was added. Subsequently, dimethyl 3-methyl-9-oxo-2,4-di(thiazol-2-yl)-7-(pyridin-2-ylmethyl)-3,7-diazabicyclo[3.3.1]nonane-1,5-dicarboxylate (750 mg, 1.42 mmol) was added and the resulting mixture was stirred at 50° C. for 10 minutes. The reaction mixture was allowed to cool to room temperature and the volatiles were evaporated in vacuo yielding a yellow oil. EtOAc (20 ml) was added and the mixture was sonicated at room temperature for 60 minutes. The resulting yellow suspension was filtered with suction over a glass-filter P4 and the solid was washed with EtOAc (5×20 ml) and Et$_2$O (5×20 ml). The last traces of volatiles were evaporated in vacuo yielding a yellow powder (817 mg, 1.15 mmol, 82%). ESI-MS m/z 300.8 [LFe$^{II}$(H$_2$O)]$^{2+}$, 307.7 [LFe$^{II}$(MeOH)]$^{2+}$, 328.4 [LFe$^{III}$($^t$BuO)]$^{2+}$ or [LFe$^{II}$(MeOH)(CH$_3$CN)]$^{2+}$, 636.2 [LFe$^{II}$(Cl)(H$_2$O)]$^+$, 650.3 [LFe$^{II}$(Cl)(MeOH)]$^+$, 660.3 [LFe$^{II}$(HCO$_2$)(MeOH)]$^+$. Elemental analysis (calc. for C$_{24}$H$_{25}$N$_5$O$_5$S$_2$FeCl$_2$·CH$_3$OH·1.5H$_2$O: C 42.09%, H 4.52%, N 9.82%, S 8.99%), found: C 42.03%, H 4.42%, N 9.53%, S 8.73%.

[(4-TBP)Fe$^{II}$Cl](Cl)·0.5MeOH·2H$_2$O (4-TBP=dimethyl 3-methyl-9-oxo-2,4-di(thiazol-2-yl)-7-(pyridin-2-ylmethyl)-3,7-diazabicyclo[3.3.1]nonane-1,5-dicarboxylate)

Dimethyl 3-methyl-9-oxo-7-(pyridin-2-ylmethyl)-2,4-di(thiazol-4-yl)-3,7-diazabicyclo[3.3.1]nonane-1,5-dicarboxylate ligand (4-TBP) (420 mg, 0.79 mmol, 1.0 equiv.) was dissolved in degassed MeOH (10 ml) under N$_2$ atmosphere. The reaction mixture was heated at 60° C. and the white powder suspense in colourless solution was observed. FeCl$_2$·4H$_2$O (158 mg, 0.79 mmol, 1.0 equiv.) was then added under N$_2$ and a clear, yellow solution was obtained instead. The resulting mixture was heated at 60° C. for further 1.5 hours. Subsequently, the mixture was allowed to cool to room temperature. The mixture was filtered using fold-filter paper and the residue was rinsed with MeOH (10 ml). The filtrates were combined and the evaporation of the volatiles in vacuo gave yellow oil. A solid was obtained by dissolving the oil in a minimum amount of MeOH, this solution was slowly added as dropwise to the vortex stirred (at 1500 rpm) of Et$_2$O (150 ml). The suspension was filtered with suction on a glass filter P4 and was subsequently washed with Et$_2$O (15 ml). The last traces of volatiles were evaporated in vacuo yielding a yellow powder (495 mg, 0.70 mmol, 88%). ESI-MS m/z 172.8 [(L)Fe$^{II}$(CH$_3$CN)]$^{2+}$, 193.3 [LFe$^{II}$(2CH$_3$CN)]$^{2+}$, 339.3 [LFe$^{II}$Cl]$^+$. Elemental analysis (calc. for C$_{24.5}$H$_{31}$Cl$_2$FeN$_5$O$_{7.5}$S$_2$: C 41.66%, H 4.42%, N 9.91%, S 9.08%); found: C 41.82%, H 4.23%, N 9.86%, S 9.47%).

Reference Sample

[Fe(N2py3)Cl]Cl was prepared as described in WO 02/48301 A1 (N2py3=dimethyl 2,4-di(pyridin-2yl)-3-methyl-7-(pyridin-2-ylmethyl)-3,7-diaza-bicyclo[3.3.1]nonan-9-one-1,5-dicarboxylate).

The alkyd resin (catalogue number A/1552/15; an alkyd resin solution of 70 wt % in white spirits) was obtained from Acros Organics.

First stock solutions were prepared of 1.43 mM of [Fe(N2py3)Cl]Cl, [(2-TBP)Fe$^{II}$Cl]Cl, [(4-TBP)Fe$^{II}$Cl]Cl, 2-TBP mixed with equimolar FeCl$_2$·4H$_2$O in ethanol and 4-TBP mixed with equimolar FeCl$_2$·4H$_2$O in ethanol. For the experiments using 0.0005% by weight Fe (with respect to weight of alkyd resin and solvent), 0.2 mL of these stock solutions were added to 3 mL of the alkyd resin and mixed. The ethanol ligand solution and FeCl$_2$·4H$_2$O was dosed immediately after mixing.

All solutions were left overnight in a closed 20 mL glass vial. After 24 h, the alkyd/paint was applied using a cube applicator (75 um) onto a glass plate. The drying process was followed using a BK-3 drying recorder set to 6 h. The time when the visible line of the alkyd coating layer on the glass plate became interrupted was recorded (denoted as alkyd curing times in table).

Results:

The results of the drying tests of the alkyd resin are shown in the table below.

Alkyd curing times (in h) of iron bispidon complexes.

The dosage level was 0.0005% by weight Fe based on alkyd resin+solvent.

| Catalyst | Scratch time (h) |
| --- | --- |
| No catalyst | >12 |
| [Fe(N2py3)Cl]Cl | 3.6 |
| [(2-TBP)Fe$^{II}$Cl](Cl) | 1.5 |
| [(4-TBP)Fe$^{II}$Cl](Cl) | 1.5 |

It should be noted that the same drying times for the preformed iron complexes and the analogous mixtures of FeCl2 and either 2-TBP or 4-TBP were recorded.

The results obtained show the following:

1. The drying activities of both 2-TBP and 4-TBP complexes are significantly improved as compared to the iron bispidon complex ([Fe(N2py3)Cl]Cl) disclosed in WO 2008/003652.

2. Either the preformed complex ([(TBP)Fe$^{II}$Cl](Cl)) or the TBP ligand premixed with one molar equivalent of FeCl$_2$·4H$_2$O in ethanol can be used without any difference in curing time. This is the case for both the 2-TBP and 4-TBP isomers.

The invention claimed is:

1. A formulation comprising an oxidatively curable alkyd-based resin and a chelant of the formula (I) or formula (II):

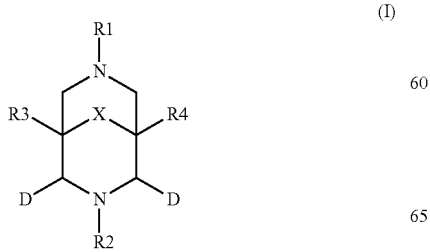

(I)

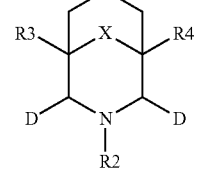

(II)

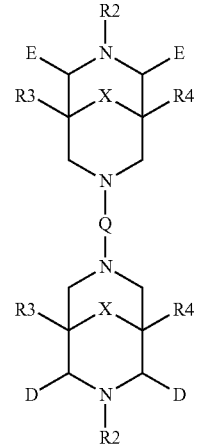

wherein:
each D is independently selected from the group consisting of thiazol-2-yl, thiazol-4-yl, pyrazin-2-yl, quinolin-2-yl, pyrazol-3-yl, pyrazol-1-yl, pyrrol-2-yl, imidazol-2-yl, imidazol-4-yl, benzimidazol-2-yl, pyrimidin-2-yl, 1,2,4-triazol-3-yl, 1,2,4-triazol-1-yl, 1,2,3-triazol-1-yl, 1,2,3-triazol-2-yl and 1,2,3-triazol-4-yl, each of which may be optionally substituted by one or more groups independently selected from the group consisting of —F, —Cl, —Br, —OH, —OC$_1$-C$_4$alkyl, —NH—CO—H, —NH—CO—C$_1$-C$_4$alkyl, —NH$_2$, —NH—C$_1$-C$_4$alkyl, and —C$_1$-C$_4$alkyl;

each E is independently selected from the group consisting of pyridin-2-yl, thiazol-2-yl, thiazol-4-yl, pyrazin-2-yl, quinolin-2-yl, pyrazol-3-yl, pyrazol-1-yl, pyrrol-2-yl, imidazol-2-yl, imidazol-4-yl, benzimidazol-2-yl, pyrimidin-2-yl, 1,2,4-triazol-3-yl, 1,2,4-triazol-1-yl, 1,2,3-triazol-1-yl, 1,2,3-triazol-2-yl and 1,2,3-triazol-4-yl, each of which may be optionally substituted by one or more groups independently selected from the group consisting of —F, —Cl, —Br, —OH, —OC$_1$-C$_4$alkyl, —NH—CO—H, —NH—CO—C$_1$-C$_4$alkyl, —NH$_2$, —NH—C$_1$-C$_4$alkyl, and —C$_1$-C$_4$alkyl;

R1 and the or each R2 are independently selected from the group consisting of C$_1$-C$_{24}$alkyl, C$_{6-10}$arylC$_1$-C$_6$alkyl, C$_{6-10}$aryl, C$_5$-C$_{10}$heteroarylC$_1$-C$_6$alkyl, each of which may be optionally substituted by one or more groups selected from —F, —Cl, —Br, —OH, —OC$_1$-C$_4$alkyl, —NH—CO—H, —NH—CO—C$_1$-C$_4$alkyl, —NH$_2$, —NH—C$_1$-C$_4$alkyl and —SC$_1$-C$_4$alkyl; and CH$_2$CH$_2$N(R8)(R9), wherein N(R8)(R9) is selected from the group consisting of di(C$_{1-44}$alkyl)amino; di(C$_{6-10}$aryl)amino in which each of the aryl groups is independently optionally substituted with one or more C$_{1-20}$alkyl groups; di(C$_{6-10}$arylC$_{1-6}$alkyl)amino in which each of the aryl groups is independently optionally substituted with one or more C$_{1-20}$alkyl groups; NR7, in which R7 and the nitrogen atom N to which it is attached represent a heterocycloalkyl group optionally substituted with one or more C$_{1-20}$alkyl groups, which is connected to the remainder of R1 or R2 through the nitrogen atom N; di(heterocycloalkyl-C$_{1-6}$alkyl)amino, in which each of the heterocycloalkyl groups is independently optionally substituted with one or more $C_{1-20}$alkyl groups; and di(heteroaryl$C_{1-6}$alkyl)amino, wherein each of the heteroaryl groups is independently optionally substituted with one or more $C_{1-20}$alkyl groups;

R3 and R4 are independently selected from hydrogen, $C_1$-$C_8$alkyl, $C_1$-$C_8$alkyl-O—$C_1$-$C_8$alkyl, $C_6$-$C_{10}$aryloxy$C_1$-$C_8$alkyl, $C_6$-$C_{10}$aryl, $C_1$-$C_8$hydroxyalkyl, $C_6$-$C_{10}$aryl$C_1$-$C_6$alkyl and $C_5$-$C_{10}$heteroaryl$C_1$-$C_6$alkyl, and —$(CH_2)_{0-4}C(O)$OR5 wherein R5 is independently selected from: hydrogen, $C_1$-$C_8$alkyl and $C_{6-10}$aryl;

Q represents a bridge selected from the group consisting of a $C_{1-6}$alkylene moiety, a $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups; and X is selected from C=O, —[C(R6)$_2$]$_{0-3}$- wherein each R6 is independently selected from hydrogen, hydroxyl, $C_1$-$C_4$alkoxy and $C_1$-$C_4$alkyl; and wherein the formulation comprises less than 0.00005% by weight of ions of each of vanadium and copper.

2. The formulation of claim 1, wherein each D is thiazol-2-yl or each D is thiazol-4-yl.

3. The formulation of claim 1, wherein each E is pyridin-2-yl.

4. The formulation of claim 2, wherein the chelant is of formula (I), one of the R1 and R2 groups is methyl and the other of the R1 and R2 groups is pyridin-2-ylmethyl.

5. The formulation of claim 1, wherein the chelant is selected from dimethyl 2,4-di(thiazol-2-yl)-3-methyl-7-(pyridin-2-ylmethyl)-3,7-diaza-bicyclo[3.3.1]nonan-9-one-1,5-dicarboxylate, dimethyl 2,4-di(thiazol-2-yl)-3-(pyridin-2-ylmethyl)-7-methyl-3,7-diaza-bicyclo[3.3.1]nonan-9-one-1,5-dicarboxylate, dimethyl 2,4-di(thiazol-4-yl)-3-methyl-7-(pyridin-2-ylmethyl)-3,7-diaza-bicyclo[3.3.1]nonan-9-one-1,5-dicarboxylate, dimethyl 2,4-di(thiazol-4-yl)-3-(pyridin-2-ylmethyl)-7-methyl-3,7-diaza-bicyclo[3.3.1]nonan-9-one-1,5-dicarboxylate, dimethyl 2,4-di(thiazol-2-yl)-3,7-dimethyl-3,7-diaza-bicyclo[3.3.1]nonan-9-one-1,5-dicarboxylate, dimethyl 2,4-di(thiazol-4-yl)-3,7-dimethyl-3,7-diaza-bicyclo[3.3.1]nonan-9-one-1,5-dicarboxylate, 1,2-di{1,5-di(methoxycarbonyl)-3-(pyridin-2-ylmethyl)-9-oxo-2,4-di(pyridin-2-yl)-3,7-diazabicyclo[3.3.1]nonan-7-yl}ethane, 1,3-di{1,5-di(methoxycarbonyl)-3-(pyridin-2-ylmethyl)-9-oxo-2,4-di(pyridin-2-yl)-3,7-diazabicyclo[3.3.1]nonan-7-yl}propane, 1,2-di{1,5-di(methoxycarbonyl)-3-methyl-9-oxo-2,4-di(pyridin-2-yl)-3,7-diazabicyclo[3.3.1]nonan-7-yl}ethane and 1,3-di{1,5-di(methoxycarbonyl)-3-methyl-9-oxo-2,4-di(pyridin-2-yl)-3,7-diazabicyclo[3.3.1]nonan-7-yl}propane.

6. The formulation of claim 1, which comprises a complex comprising the chelant and a transition metal ion selected from the group consisting of ions of iron and manganese.

7. The formulation of claim 6, wherein the complex comprises an iron ion.

8. The formulation of claim 1, which formulation comprises less than 0.00005% by weight of ions of each of iron, manganese, cobalt, vanadium and copper.

9. A method of preparing a formulation as defined in claim 1, the method comprising contacting a composition comprising an alkyd-based resin with a composition comprising the chelant.

10. The method of claim 9 wherein the formulation is as defined in claim 8, optionally wherein the method further comprises contacting the formulation with a source of iron or manganese ions from an optionally hydrated salt selected from the group consisting of $MnCl_2$, $FeCl_2$, $FeCl_3$, $MnBr_2$, $Mn(NO_3)_2$, $Fe(NO_3)_3$, $MnSO_4$, $FeSO_4$, $(Fe)_2(SO_4)_3$, Mn(acetylacetonate)$_2$, Fe(acetylacetonate)$_2$, Mn(acetylacetonate)$_3$, Fe(acetylacetonate)$_3$, Mn(R$_5$COO)$_3$, Fe(R$_5$COO)$_3$, Mn(R$_5$COO)$_2$ and Fe(R$_5$COO)$_2$, wherein each R$_5$ is independently a $C_1$-$C_{24}$ alkyl.

11. The method of claim 9, wherein the composition comprising the chelant comprises a complex as defined in claim 6.

12. The formulation of claim 1 wherein the chelant is of formula (I) or (II) as defined in claim 1, which is dimethyl 2,4-di(thiazol-2-yl)-3-methyl-7-(pyridin-2-ylmethyl)-3,7-diaza-bicyclo[3.3.1]nonan-9-one-1,5-dicarboxylate, dimethyl 2,4-di(thiazol-2-yl)-3-(pyridin-2-ylmethyl)-7-methyl-3,7-diaza-bicyclo[3.3.1]nonan-9-one-1,5-dicarboxylate, dimethyl 2,4-di(thiazol-4-yl)-3-methyl-7-(pyridin-2-ylmethyl)-3,7-diaza-bicyclo[3.3.1]nonan-9-one-1,5-dicarboxylate, dimethyl 2,4-di(thiazol-4-yl)-3-(pyridin-2-ylmethyl)-7-methyl-3,7-diaza-bicyclo[3.3.1]nonan-9-one-1,5-dicarboxylate, dimethyl 2,4-di(thiazol-2-yl)-3,7-dimethyl-3,7-diaza-bicyclo[3.3.1]nonan-9-one-1,5-dicarboxylate, dimethyl 2,4-di(thiazol-4-yl)-3,7-dimethyl-3,7-diaza-bicyclo[3.3.1]nonan-9-one-1,5-dicarboxylate, 1,2-di{1,5-di(methoxycarbonyl)-3-(pyridin-2-ylmethyl)-9-oxo-2,4-di(pyridin-2-yl)-3,7-diazabicyclo[3.3.1]nonan-7-yl}ethane and 1,3-di{1,5-di(methoxycarbonyl)-3-(pyridin-2-ylmethyl)-9-oxo-2,4-di(pyridin-2-yl)-3,7-diazabicyclo[3.3.1]nonan-7-yl}propane, or a transition metal ion complex thereof.

13. A kit comprising a formulation as defined in claim 8 and, separately, a composition comprising transition metal ions selected from the group consisting of iron and manganese ions.

* * * * *